US012789601B2

(12) United States Patent
Nellen et al.

(10) Patent No.: US 12,789,601 B2
(45) Date of Patent: Nov. 10, 2026

(54) ROOF SYSTEM FOR A VEHICLE

(71) Applicants: Marcel Johan Christiaan Nellen, Merselo (NL); Ruud Geurts, Helden (NL); Bjorn Arnoldus Franciscus Welmer, Deurne (NL); Rainer Gerhard Jüngling, Mönchengladbach (DE)

(72) Inventors: Marcel Johan Christiaan Nellen, Merselo (NL); Ruud Geurts, Helden (NL); Bjorn Arnoldus Franciscus Welmer, Deurne (NL); Rainer Gerhard Jüngling, Mönchengladbach (DE)

(73) Assignee: INALFA ROOF SYSTEMS GROUP B.V., Oostrum (NL)

( * ) Notice: Subject to any disclaimer, the term of this patent is extended or adjusted under 35 U.S.C. 154(b) by 230 days.

(21) Appl. No.: 18/822,192

(22) Filed: Aug. 31, 2024

(65) Prior Publication Data

US 2025/0074168 A1 Mar. 6, 2025

(30) Foreign Application Priority Data

Sep. 1, 2023 (EP) .................................... 23194819
Nov. 16, 2023 (EP) .................................... 23210230

(51) Int. Cl.
*B60J 7/043* (2006.01)
*B60J 7/057* (2006.01)
(Continued)

(52) U.S. Cl.
CPC ............ *B60J 7/043* (2013.01); *B60J 7/0573* (2013.01); *B60J 7/192* (2013.01);
(Continued)

(58) Field of Classification Search
CPC ..... B60J 7/02; B60J 7/024; B60J 7/043; B60J 7/0435; B60J 7/05; B60J 7/0573;
(Continued)

(56) References Cited

U.S. PATENT DOCUMENTS 3,873,150 A 3/1975 Marr et al.
4,005,901 A 2/1977 Lutke et al.
(Continued)

FOREIGN PATENT DOCUMENTS

DE 102005007031 A1 8/2006
DE 102010034556 A1 2/2012
(Continued)

OTHER PUBLICATIONS

Search Report in corresponding European patent application No. 23210230.1 dated May 3, 2024.
(Continued)

*Primary Examiner* — Lori Lyjak
(74) *Attorney, Agent, or Firm* — Steven M. Koehler; Westman, Champlin & Koehler, P.A.

(57) ABSTRACT

A roof system for a vehicle has a fixed roof with a roof opening that may be closed by roof panel. The roof system including a pair of parallel guide rails and an operating mechanisms for each of the guide rails. Each operating mechanism includes a front mechanism, a tilting mechanism, and a locking mechanism for locking the tilting mechanism. Wherein the locking mechanism is slidably guided in the guide rail and is rearward of and remote from the tilting mechanism seen in a longitudinal direction of the vehicle. An effect thereof is that the package of the front mechanism may be reduced and along therewith the space required therefor inside the guide rail, allowing for a smaller cross-section of the guide rail.

20 Claims, 28 Drawing Sheets

(51) Int. Cl.
*B60J 7/19* (2006.01)
*E05D 15/10* (2006.01)
*E05F 15/662* (2015.01)

(52) U.S. Cl.
CPC ........ *E05D 15/1081* (2013.01); *E05F 15/662* (2015.01); *E05Y 2900/542* (2013.01)

(58) Field of Classification Search
CPC ......... B60J 7/19; B60J 7/192; E05D 15/1081; E05F 15/662; E05Y 2900/542
See application file for complete search history.

(56) References Cited

U.S. PATENT DOCUMENTS

| | | | | |
|---|---|---|---|---|
| 4,877,285 | A | | 10/1989 | Huyer |
| 4,911,497 | A | | 3/1990 | Schreiter et al. |
| 5,601,330 | A | * | 2/1997 | Ulbrich ...................... B60J 7/04 296/222 |
| 5,746,475 | A | | 5/1998 | Caye et al. |
| 5,765,908 | A | | 6/1998 | Kelm |
| 5,971,473 | A | | 10/1999 | Kelm |
| 6,012,768 | A | | 1/2000 | Nabuurs et al. |
| 6,129,413 | A | | 10/2000 | Klein |
| 6,158,803 | A | | 12/2000 | Reihl et al. |
| 6,164,718 | A | | 12/2000 | Stallfort |
| 6,199,944 | B1 | | 3/2001 | Lee et al. |
| 6,224,146 | B1 | | 5/2001 | Willard et al. |
| 6,257,658 | B1 | | 7/2001 | Nabuurs et al. |
| 6,390,545 | B1 | | 5/2002 | Makino et al. |
| 6,454,347 | B2 | | 9/2002 | Lee et al. |
| 6,527,337 | B2 | | 3/2003 | Färber |
| 7,850,231 | B2 | | 12/2010 | Ito et al. |
| 8,136,872 | B2 | | 3/2012 | Nellen |
| 8,567,859 | B2 | | 10/2013 | Grimm et al. |
| 8,870,276 | B2 | | 10/2014 | Geurts et al. |
| 9,266,415 | B1 | | 2/2016 | Nellen et al. |
| 10,960,742 | B2 | | 3/2021 | Hiramatsu |
| 10,974,580 | B2 | | 4/2021 | Carlson et al. |
| 11,926,202 | B2 | | 3/2024 | Jüngling et al. |
| 2002/0021031 | A1 | | 2/2002 | Radmanic et al. |
| 2005/0218704 | A1 | | 10/2005 | Uehara et al. |
| 2009/0072589 | A1 | | 3/2009 | Ito et al. |
| 2011/0285181 | A1 | | 11/2011 | Manders et al. |
| 2012/0235448 | A1 | | 9/2012 | Grimm et al. |
| 2015/0130225 | A1 | | 5/2015 | Sawada et al. |
| 2018/0199547 | A1 | | 7/2018 | Moore et al. |
| 2020/0276892 | A1 | | 9/2020 | Hiramatsu |
| 2023/0026689 | A1 | | 1/2023 | Jüngling et al. |

FOREIGN PATENT DOCUMENTS

| | | | |
|---|---|---|---|
| DE | 102016123693 | A1 | 6/2018 |
| EP | 0221241 | A2 | 5/1987 |
| EP | 1741588 | A1 | 1/2007 |
| EP | 2450210 | B1 | 3/2014 |
| ES | 2462922 | T3 | 5/2014 |
| GB | 384356 | A | 12/1932 |
| JP | S59-156820 | A | 9/1984 |

OTHER PUBLICATIONS

International Search Report and Written Opinion in corresponding International Application Ser. No. PCT/EP2024/073680 dated Nov. 28, 2024.

* cited by examiner

62
NC
24
20

65
41
62
Tilt
32
30, 30'
36
24
63
22
20

62
Slide
10
24
20

ROOF SYSTEM FOR A VEHICLE

CROSS-REFERENCE TO RELATED APPLICATION

The present application is based on and claims the benefit of European patent application Serial No. 23194819.1, filed Sep. 1, 2023, and European patent application Serial No. 23210230.1, filed Nov. 16, 2023, the contents of which are hereby incorporated by reference in their entirety.

BACKGROUND

The discussion below is merely provided for general background information and is not intended to be used as an aid in determining the scope of the claimed subject matter.

In modern cars there is a quest for maximizing headroom and maximizing the daylight opening in roof systems. However, with the emergence of electric vehicles, the general layout of cars is changing. The space required for battery packs is commonly found at the bottom of cars, raising the ground level of the passenger compartment and in particular of the seats present therein. Since the overall aerodynamic front face of vehicle is to be maintained, the roof is not raised resulting in a reduction of headroom. As a consequence, the height available for a roof system is reduced. To address this, car manufacturers have introduced fixed, stationary glazing panels to obtain the required reduction in what is referred to as Z-package. These stationary panels may provide a visually connecting experience with the exterior surroundings, but lack the flexibility to accommodate for different environmental circumstances, as fresh air on bright sunny mornings and cover on dark, rainy afternoons. Accordingly, there is a need to provide a roof system that can balance these conflicting requirements.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in deter-mining the scope of the claimed subject matter. The claimed subject matter is not limited to implementations that solve any or all disadvantages noted in the Background.

A roof system according to an aspect of the invention, is equipped with a locking mechanism which is slidably guided in the guide rails and is completely rear and remote of the tilting mechanism seen in a longitudinal direction of the vehicle.

The advantage of this feature is that an operating mechanism usually has two main parts, a front mechanism and a rear or tilting mechanism. All of the parts required in these front and rear mechanisms need to be packaged or positioned in the guide rails. The front and rear mechanism have multiple operating positions, such as when the glass panel is in a closed position, or the glass panel is in a tilted position or when the glass panel is completely in an open position. In each of these positions and in between these positions the detailed parts of the front and rear mechanisms need to be movable and need their respective space to perform their respective operational function within the boundaries of the guide rail. As the guide rail is an important part of the roof system, which by its size and especially the size of a cross section (taken in a laterally direction extending vertical plane) influences the head room of the occupants in the vehicle and the day light opening. When reducing the height and the width, respectively the head room and the day light opening are improved. In the present invention the front mechanism is changed in that the locking mechanism that ensures the locking of the tilting mechanism usually combined in the front mechanism, is now placed rearward of and remote from the rear mechanism. The effect thereof is that the package, e.g. in number of parts, of the front mechanism may be reduced and along therewith the space required inside the guide rail therefor, which allows for a smaller cross-section of the guide rail.

According to a first embodiment, the guide rails extend uninterruptedly in longitudinal direction and wherein the front mechanism, the tilting mechanism and the locking mechanism are in slidable connection with the guide rails. In this embodiment the guide rail extends as a one-piece part in a longitudinal direction.

According to a second embodiment, each of the guide rails comprises a first, frontguide rail placed in front of a second, rear guide rail seen in longitudinal direction and wherein the front and rear guide rails are separate parts and remote from each other and in line with each other and wherein the front guide rail is in slidable connection with the front mechanism and the tilting mechanism and the rear guide rail is in slidable connection with the locking mechanism. In this second embodiment the guide rail is split up in a front and a rear part with a certain distance between the rear part of the front guide rail and the front part of the rear guide rail. This distance may be required to be used for other parts, such as a cross member of the body vehicle. To connect the front mechanism with the locking mechanism and to connect the locking mechanism with the tilting mechanism it is conceivable that connecting parts bridge the distance between the front and rear guide rails such that each of the operating mechanism parts are operable.

According to another aspect of the invention the locking mechanism comprises a locking lever and a locator, wherein the locator and the locking lever comprise a pin slot and a locking pin slidably guided in the pin slot and wherein the locator is fixedly attached to the guiderail. And the pin slot has a first substantially horizontal slot portion for guiding the locking pin and a second substantially vertical locking slot portion to lock the locking pin. Hence, the pin slot may be in the locator with the locking pin on the locking lever or, vice versa, the pin slot may be in the locking lever with the locking pin on the locator. The locking mechanism is placed in the guide rail, behind the tilting mechanism seen in longitudinal direction and there is no direct contact between the locking mechanism and the tilting mechanism. The advantage now is that because the locking mechanism is not adjacent to the tilting mechanism, more space is available behind the tilting mechanism for this locking mechanism. So, a reduced width and height of the guide rail may be reached. The locator and the locking lever of the present invention for instance may now be placed in the middle of the guide rail where there is plenty of space available.

According to another aspect of the invention the front mechanism comprises a driving slide which is connected to first drive members for driving the driving slide and wherein a second drive member connects the driving slide to the locking mechanism for driving the locking mechanism at least during the vertical movement of the rear edge of the panel. The front mechanism is driven by the driving slide which is connected to the first drive members which in turn are driven by the electric motor. The part of the guide rail used for the first drive members is a channel which is also used to guide a second drive member extending from the driving slide to the locking mechanism. This ensures that there is no separate space required in the guide rail to accommodate the connection between the front mechanism and locking mechanism.

According to yet another aspect of the invention the tilting mechanism comprises a sliding guide slidably guided in the guide rail capable of moving one end of an auxiliary lever in a substantially vertical direction and wherein said auxiliary lever is in slidable contact with the sliding guide and wherein the auxiliary lever at one end is pivotally connected to the slide claw for moving the slide claw in a vertical direction. And said slide claw at opposite lateral sides is hingeably connected to a pair of lifting levers said lifting levers at an opposite end being pivotally connected to a housing, the housing being fixedly connected to the guide rail. And further the sliding guide is provided with a first, second and third guide slots and wherein the auxiliary lever is provided with a first, second and third pin, each of which being slidably guided in the respective slots of the sliding guide. And further the first guide slot of the sliding guide comprises a first substantially horizontal extending slot portion and a subsequently perpendicularly vertical locking slot portion and wherein the second guide slot comprises a substantially horizontal slot portion, the third guide slot of the sliding guide comprises a first substantially horizontal slot portion and a subsequent upwardly curved slot portion. The tilting mechanism has been made slimmer by reducing its width too. Likewise with the front mechanism detailed parts of the tilting mechanism have been positioned in a row in the guide rail rather than side by side in lateral direction. In the present invention the sliding guide with the auxiliary lever has been placed in front of the slide claw and the pair of lifting levers. This reduces the required width of the guide rail further. The core of the slide claw is a U-shaped bracket which fits around the lower half of the panel bracket with the panel bracket guide. However, the plastic shoe in the slide claw is only provided at one lateral side and the lower side. This makes the mechanism even slimmer in the area of the slide claw.

According to another aspect, the locking lever is pivotally connected to one lateral side of a hinge block and wherein a connecting rod is connected to the opposite lateral side of the hinge block, said connecting rod being connected to the sliding guide. And further to describe the driving path towards the tilting mechanism, the second drive member being connected to the locking lever capable of driving the locking lever in a longitudinal direction and wherein the locking lever is hingeably connected to the hinge block, wherein the hinge block is connected to the connecting rod, which in turn is slidably connected to the sliding guide, wherein the interconnected forementioned parts are capable of moving in longitudinal direction and therewith driving a part of the tilting mechanism in a vertical direction causing a vertical movement of the rear of the first panel. So the path of driving the tilting operation of the tilting mechanism extends from the electric motor via the first drive member to the driving slide at the front, and thereafter via de second drive member to the locking lever and via the connected hinge block and the connecting rod to the sliding guide, whereby in a rearward movement of these combined driving parts the rear of the panel is moved in an upward direction and in case these combined driving parts are moved to the front, the panel is moved in a downward direction.

According to another aspect, the second drive member at a rear end and the locking lever at a front end are provided with a locking joint comprising a locking cam and a locking slot for engagement of the locking cam. Wherein the locking slot is provided with a substantially longitudinal catching portion and a substantially perpendicular locking portion. When the locking lever is locked in the locator, the locking lever is lowered at its front end because its rear end is hingeably connected to the hinge block. Due to the shape of the locking slot the locking pin is lowered into the catching slot of the second drive member and the drive member is no longer in physical contact with the locking lever pin. So, upon a further longitudinal movement of the second drive member to the rear, the second drive member will continue to be moved rearwards without taking along the locking lever. The locking slot is open at one end (catching portion) and closed at its other end (locking portion).

According to another embodiment the locking mechanism is placed in the guide rails completely rear of a rear edge of the first panel seen in longitudinal direction of the vehicle. In such cases where the first panel will be the only panel in the roof system, the locking mechanism may be placed rear of the rear edge of this panel. In such a case the locking mechanism may be below a part of the fixed roof or another part that is fixed to the roof.

According to yet another embodiment the roof system further comprises a second panel and wherein the locking mechanism is placed in the guide rails completely rear of a front edge of the second panel seen in longitudinal direction of the vehicle. Depending on the construction and available space the locking mechanism may be positioned very nearly behind (rear of) the tilting mechanism, however it is conceivable that the locking mechanism is placed rear of the front edge of the second panel in case the roof system has a second panel. In such a case that the construction underneath the first and second panel may comprise obstructions that would compromise the space for the locking mechanism, the locking mechanism may be placed more to the rear to avoid interferences with such obstructions.

According to another embodiment the roof system further comprises a drain channel to drain water and wherein the locking mechanism is placed in the guide rails at least partly underneath the drain channel seen in vertical direction. In case the roof system comprises a first and second panel it is conceivable that below the adjoining rear edge of the front panel and the front edge of the rear panel a drain channel is provided. The drain channel may form an obstruction for the guide rail, such that locally flanges of the guide rails need to be removed, nevertheless the locking mechanism parts may be conceived in such a way that at least part of the locking mechanism is placed underneath the drain channel.

According to another aspect the guide rails are provided with a hole in the bottom of the guide rail locally underneath the locking mechanism. In case it is required to service the locking mechanism and it is not possible to remove a second panel to be able to exchange parts from above, it may be conceivable to do this from below, via the hole in the guide rails.

According to another aspect of the second embodiment, the front guide rail is placed in line with the rear guide rail such that second drive member and connecting rod, being slidably engaged in guide rails, may extend between said guide rails and operationally drive respectively the locking mechanism in guide rail and the tilting mechanism in guide rail. In this aspect of the second embodiment the space between the rear part of the front guide rail and the front part of the rear guide rail is bridged only by the second drive member and the connecting rod and so there is no guide rail in this area. Which means that there is more room in this space for other parts such as for instance parts of the body of the vehicle or a drain channel.

According another aspect of the second embodiment the connection between the front mechanism and the locking mechanism and the connection between the locking mechanism and the tilting mechanism is made by a pair of flexible cables guided in respective channels in the guide rails and wherein said cables, in between the front guide rail and the rear guide rail, are guided by cable tubes attached on opposite sides to the guide rails. It is conceivable that instead of having solid parts such as the second drive member and the connection rod the connection may be made by flexible drive cables which are guided in drive tubes. The advantage of this is that in the bridging space between the front guide rail and the rear guide rail a drive tube/drive cable combination may be designed such that a curvature in the drive tube/drive cable configuration is conceivable. This may be required when the drive tube/drive cable combination needs to be guided around a part which is otherwise too near.

According to other aspects of the invention the rear guide rail is either of an aluminum or a plastic part and wherein said rear guide rail is mounted to either of the stationary part, an inner portion of the fixed roof or an inner surface of the second panel. It is conceivable that the rear guide rail is an aluminum extrusion profile having the same or a different section as the front guide rail. It is also conceivable that the rear guide rail is made of plastic as an extrusion part or an injection molded part. In the latter example it is conceivable that certain parts of the locking mechanism may be formed as an integrated part of the plastic rear guide rail. The rear guide rail in a preferred embodiment may be fixed to the stationary part of the roof system, this may be conceivable when the roof system is a so called top loaded system having two panels. It is also conceivable that in such roof system having two panels whereby the second panel is a fixed panel, the rear guide rails are fixed to an inner surface of the second panel. However, it is also conceivable that the roof system is a top loaded system having just one (movable) panel, whereby the rear part of the panel is adjacent to the fixed roof. In such case the rear guide rails may be fixed to an inner portion of the fixed roof. The same way of fixing may be used in case of the roof system being a so called "bottom loaded" system having one (movable) panel.

The roof system according to the invention will be further elucidated with reference to the drawings showing an embodiment of the roof system by way of example only.

BRIEF DESCRIPTION OF THE DRAWINGS

FIGS. 7-12A, 13-16 are enlarged sectional views along the lines VII to XVI in FIG. 4.

DETAILED DESCRIPTION OF ILLUSTRATIVE EMBODIMENTS

In the following description spatial references as, for example, front, side and rear, or underneath, below and above, or forward and rearward direction and driving movement, are made with regard to the general orientation of a vehicle, such as a passenger car. And in particular to a driver behind a steering wheel of such as vehicle. In addition, X-, Y- and Z-direction will refer to a direction corresponding to length, width and height of a vehicle. In the figures, a forward driving movement of a vehicle may be indicated by an arrow D, and consequently pointing in a direction towards a front side of vehicle.

Figure 1A:
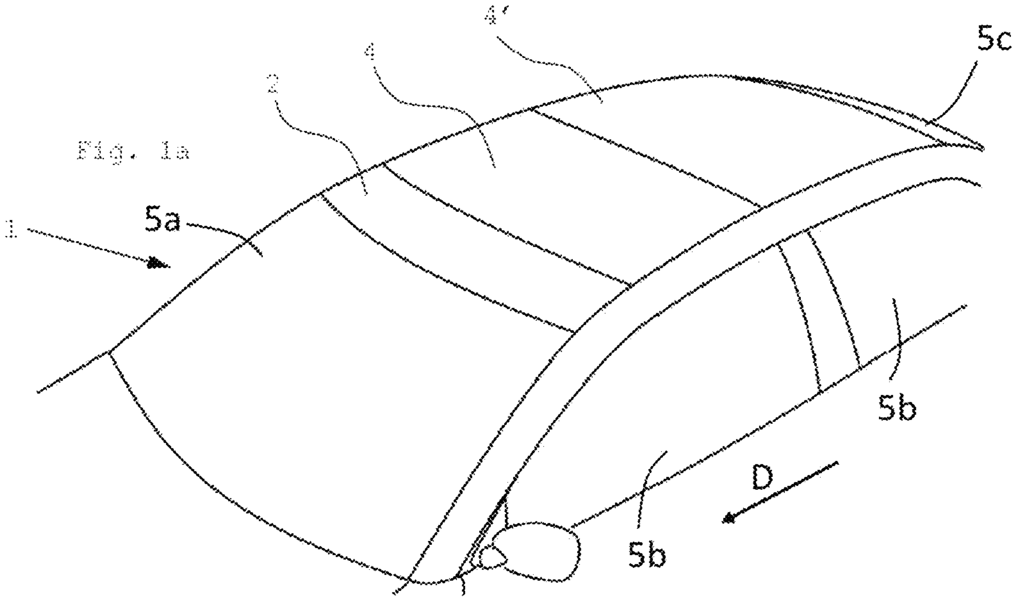
FIGS. 1*a* and 1*b* are schematic perspective views of a vehicle roof having a roof system of which the panel is shown in closed and open position, respectively.
Figure 1B:
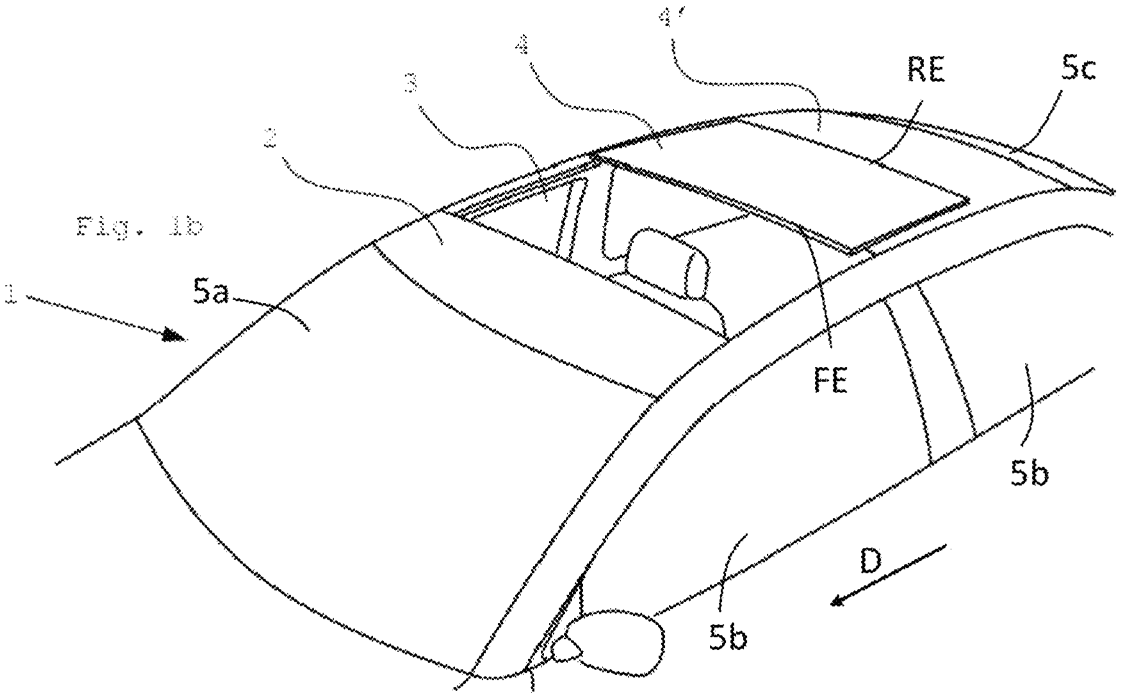

Firstly, referring to FIGS. 1*a* and 1*b*, a roof system is schematically illustrated. In a fixed roof 2 of a vehicle 1 a roof opening 3 is defined which can be closed (FIG. 1*a*) and opened (FIG. 1*b*) by a movable closure, here a rigid, at least partly (semi) transparent first panel 4, made of glass, plastic or the like. The roof system may include a second panel 4' which is generally a fixed panel but may also be movable as well.

Figure 20:
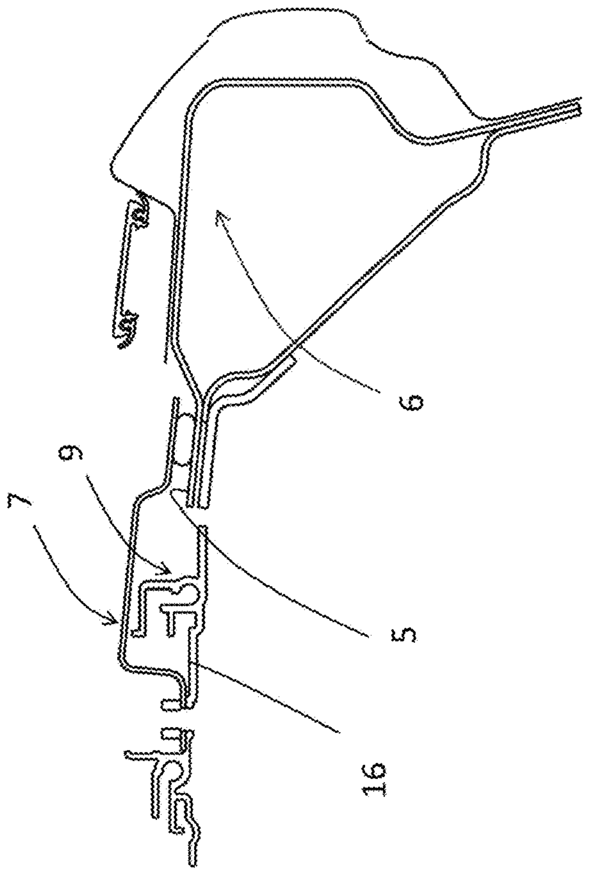
FIGS. 19 and 20 are sectional views along the lines XIX respectively XX in FIG. 2.
Figure 19:
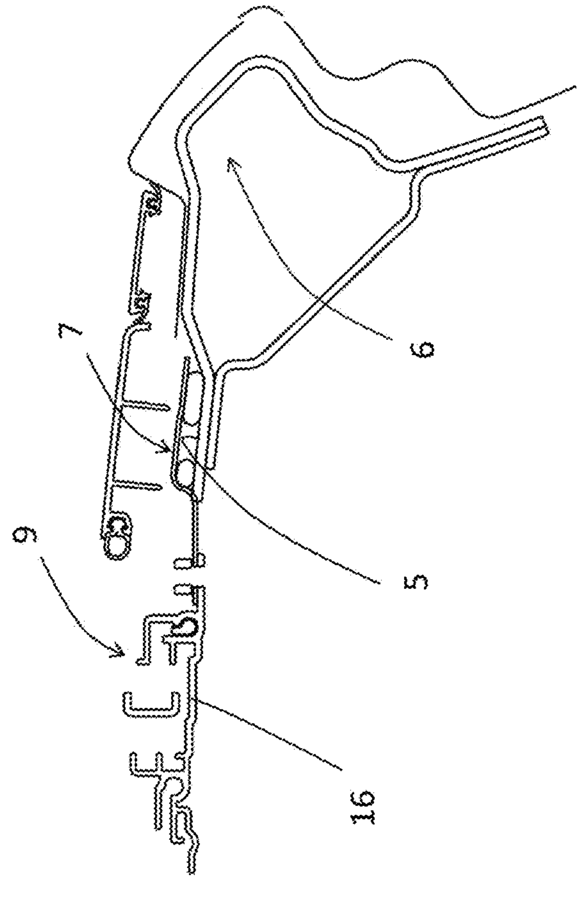

The roof system is a so-called top-loaded roof system in which a stationary part 7 of the roof system is introduced onto the roof opening 3 from above, is resting on the fixed roof 2, normally a flange 5 of a roof beam 6, see FIGS. 19 and 20. The stationary part 7 is attached to the fixed roof 2 of vehicle 1 in a suitable manner, preferably gluing, but also welding and bolting would be possible, depending on the materials used.

The roof system shown here is a so-called spoiler roof in which panel 4 is movable from its closed position upwardly (at least with its rear side) and then rearwardly to positions above the fixed roof 2, or in this case above rear panel 4'. The operating mechanism 10, in particular the supports for panel 4, remains mainly within the roof opening 3, contrary to a top slider roof in which rear supports of the panel 4 slide in guide rails 9 that extend or are extended to positions behind roof opening 3.

Figure 2:
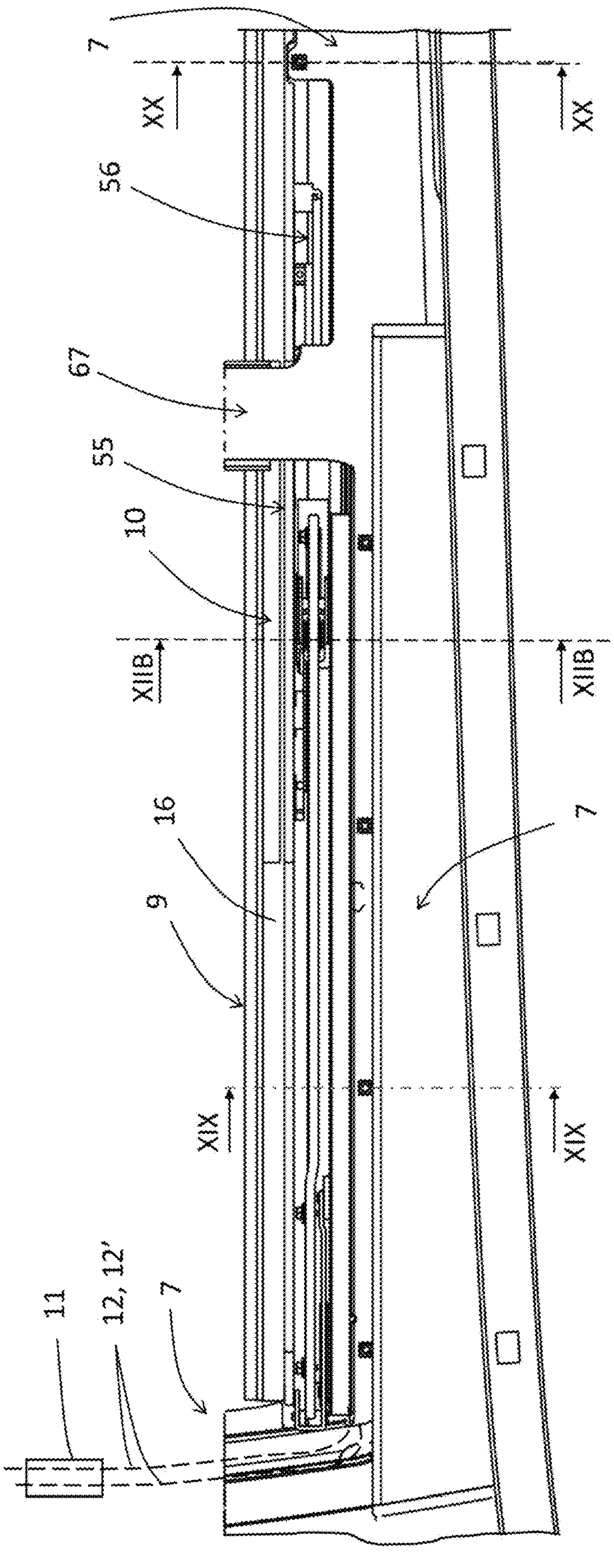
FIG. 2 is a plan view of a part of the vehicle roof of FIG. 1*a* without the panel, and with the frame.
Figure 12A:
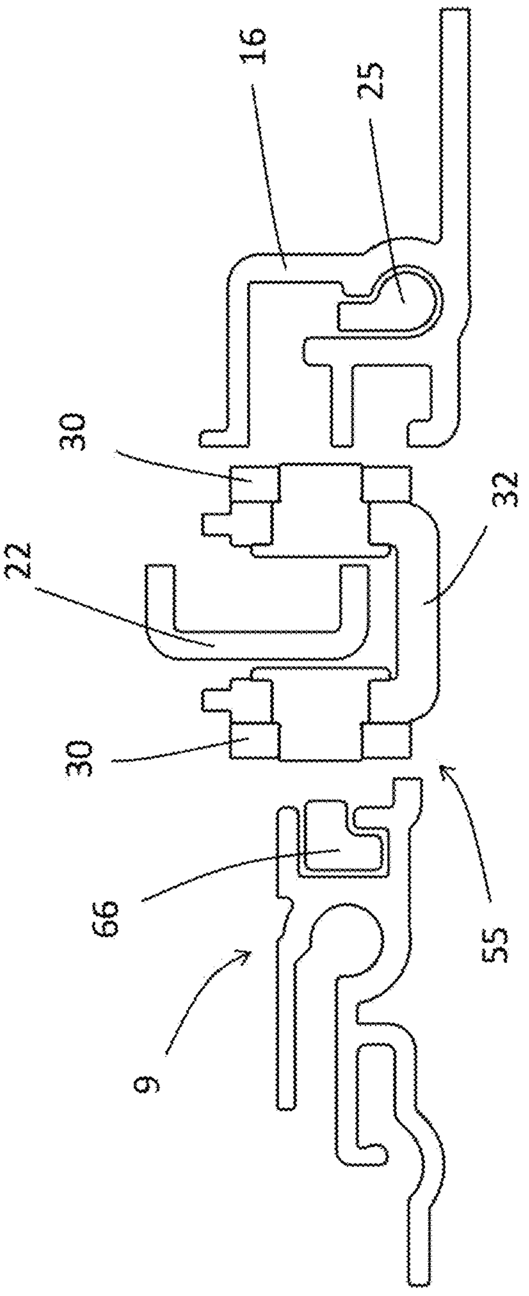
Figure 12B:
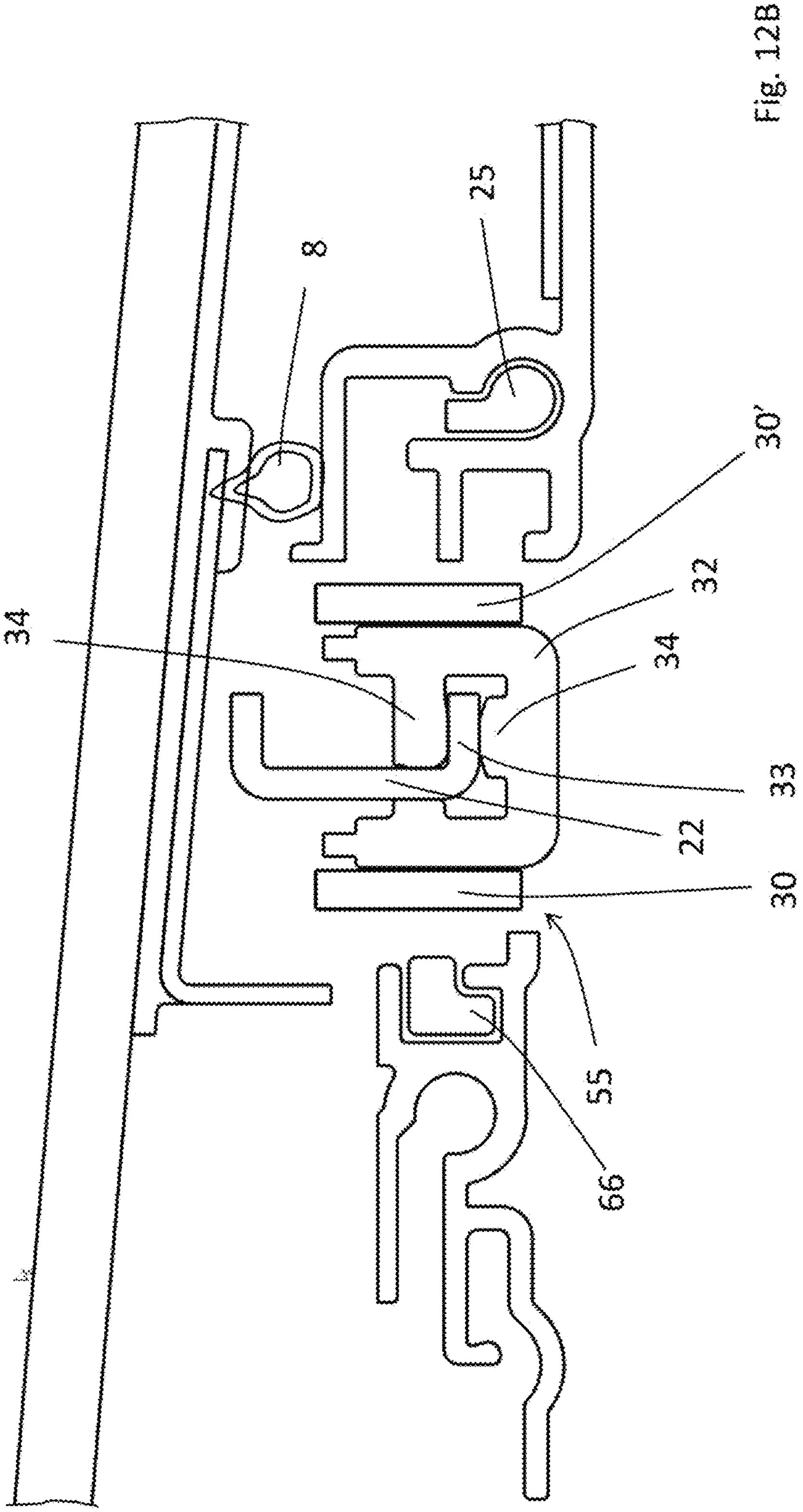
FIG. 12B, is a sectional view along lines XIIB FIG. 2.
Figure 13:
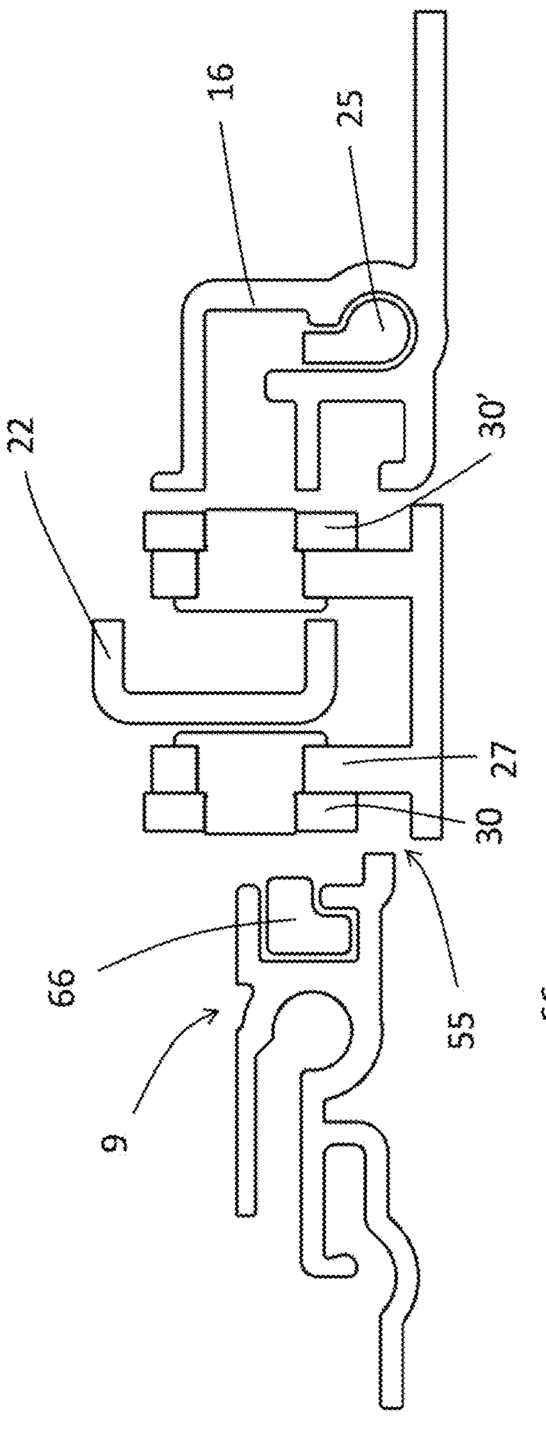

FIG. 2 shows some of the components of the roof system whereby one lateral side of the roof opening 3 is shown. A stationary part 7 forms the main component of the roof system. In this case stationary part 7 is made from plastic material by injection molding providing great freedom of design. However, it is also possible that the stationary part 7 is made of another material, for instance steel. The stationary part 7 or the guide rail 9 carry a panel seal 8 (shown in FIG. 12B)) sealing panel 4 from below. Guide rail 9 is fixed to frame 7 in longitudinal direction below each side edge of panel 4. The length of guide rail 9 is such that it extends substantially from the front to the rear of roof opening 3, whereby in case of a second panel 4', the guide rail 9 may extend all the way to the rear of the second panel 4'. An operating mechanism 10 is connected to and guided in each guide rail 9 and an electric motor 11 (shown in FIG. 2) is capable of driving parts of operating mechanisms 10 through drive cables 12, 12' (also shown in FIG. 2).

Figure 3A:
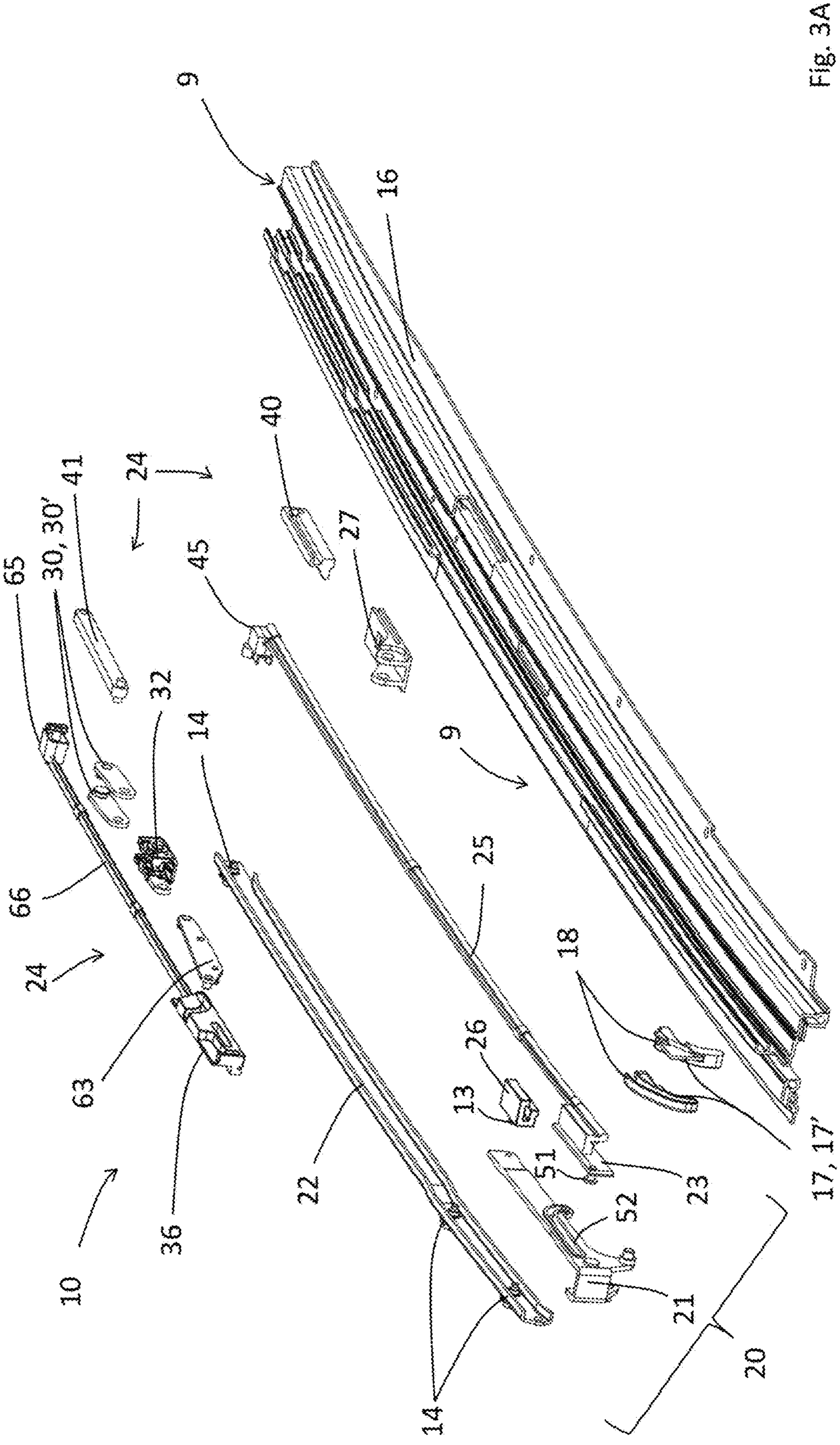
FIGS. 3*a* and 3*b* are exploded views of the parts of the operating mechanism for the panel of the roof system of FIG. 2, on a larger scale and viewed from the laterally outside and inside.
Figure 3B:
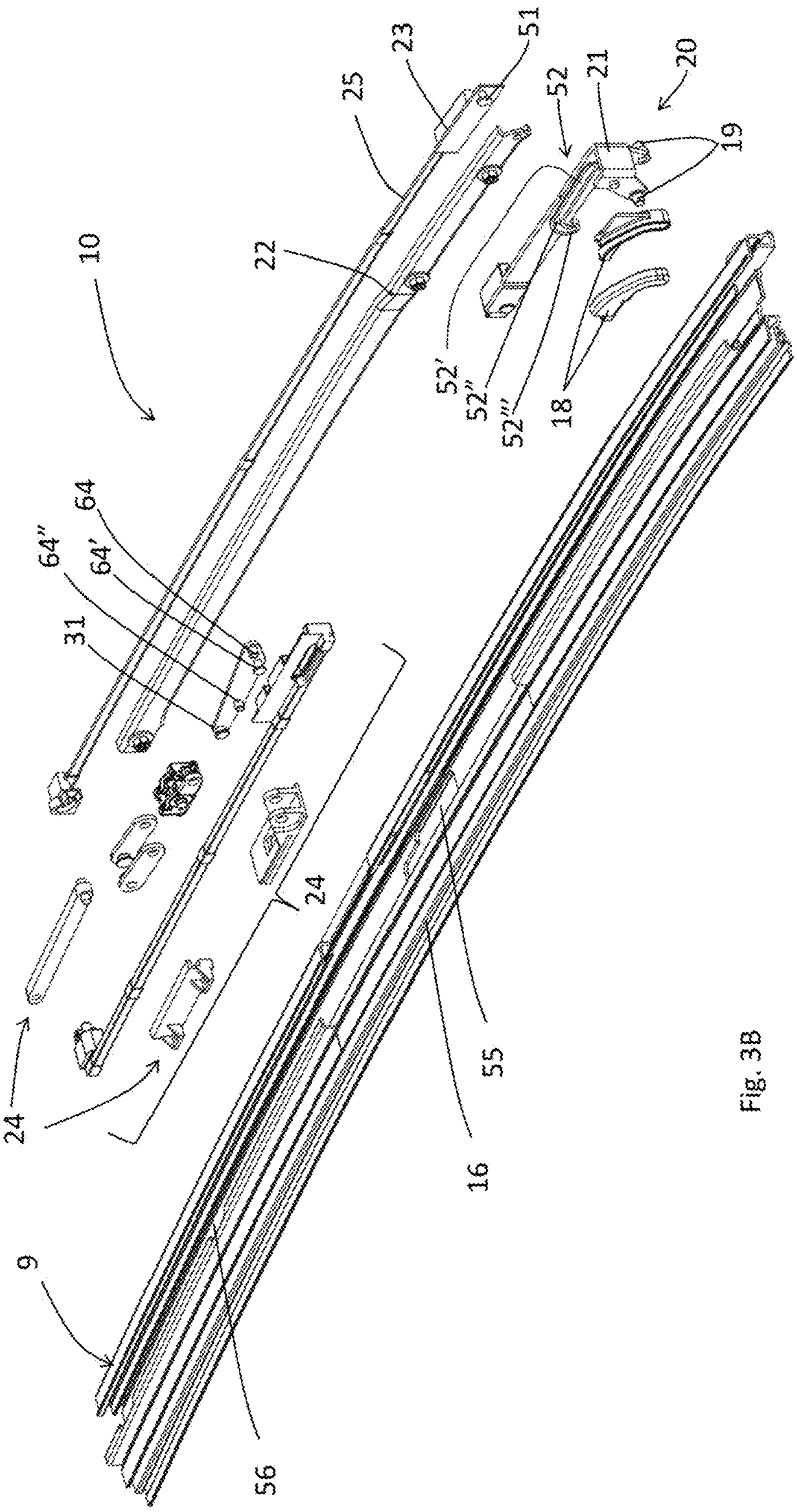

FIGS. 3*a* and *b* illustrate schematically one of the guide rails 9 and operating mechanism 10. It should be kept in mind that the roof system comprises an equal guide rail 9 and operating mechanism 10 on the opposite side, albeit configured in mirror image. Guide rail 9 comprises an extrusion profile 16, for example from aluminum, having one or more guide grooves 17, 17', 50 and guide channels 28, 29. The extrusion profile 16 is straight or slightly bent downwards to follow the downward curvature of fixed roof 2 of vehicle 1. Further FIGS. 3*a* and 3*b* show the operating mechanism 10 from respectively the lateral outward side looking inwardly into the vehicle 1 and the lateral inward side looking outwards of the vehicle 1. Operating mechanism 10 comprises a front mechanism 20, a tilting mechanism 24 and a locking mechanism 62. Each of these mechanisms has a particular function in the movement of panel 4, related to each of the positions that the panel 4 may be positioned.

FIGS. 5A-6C show these positions as being the normal closed position (NC), the tilt position (Tilt) and the open position (Slide). The front mechanism 20, in closed position, is capable of locking panel 4 in a longitudinal direction. And when the rear of the panel 4 has been lifted in a vertical direction towards a so-called "tilt" position the front mechanism 20 is capable of lifting the front of the panel 4 and subsequently capable of sliding the panel 4 rearwards in a longitudinal direction. The front mechanism 20 is driven by first drive members 12, 12' which in turn are driven by the electric motor 11. The tilting mechanism 24 is capable of lifting the rear end of panel 4 to the tilt position and is capable of supporting panel 4 when the panel 4 moves rearward in longitudinal direction. The tilting mechanism 24 is driven by locking mechanism 62. The locking mechanism 62 is capable of transferring the longitudinal movement of the second drive member 25 towards the tilting mechanism 24. When the tilting mechanism 24 has reached the required tilt height of the rear end of the panel 4, the locking mechanism 62 locks the tilt mechanism 24. This means that the locking mechanism 62 functions as a mechanical lock that prevents the tilting mechanism 24 from moving further in any vertical direction going upwardly or downwardly. The locking mechanism 62 is driven by second drive member 25 which in turn is driven by the driving slide 23 of the front mechanism 20. And further the locking mechanism 62 is capable of decoupling from the second drive member 25 and the drive member 25 is capable of continuing to be moved in a longitudinal direction and therewith the front mechanism 20 to continue its longitudinal motion to slide the panel 4 to the rear (see also FIGS. 5A-6C).

Figure 8:
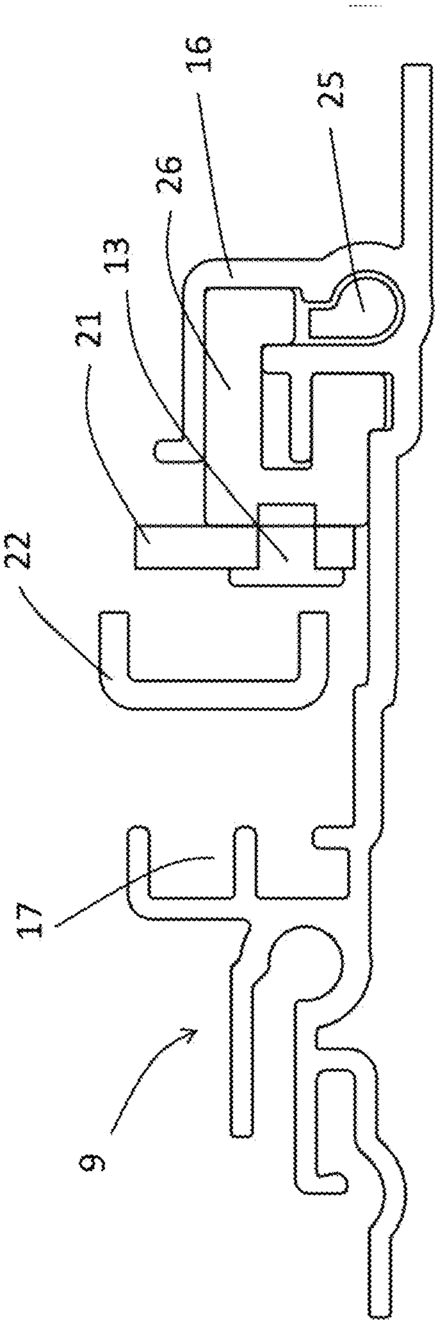
Figure 9:
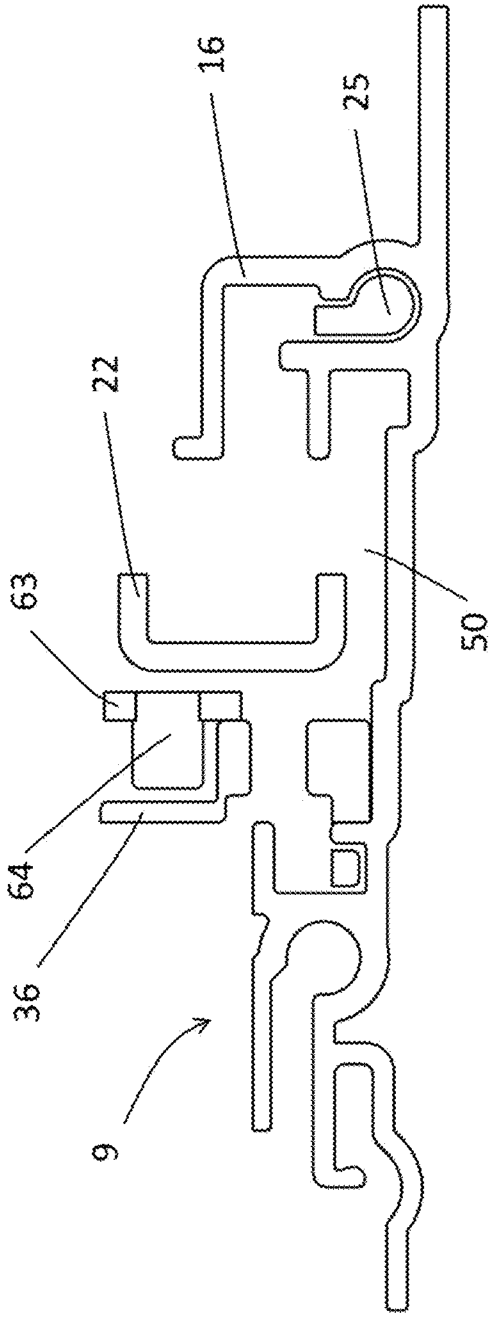
Figure 10:
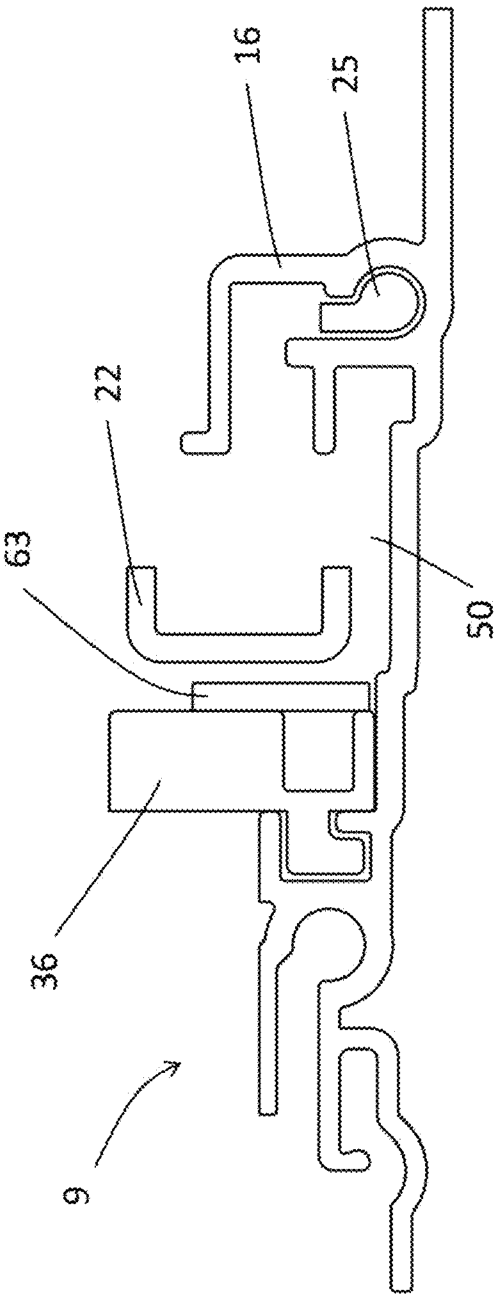
Figure 11:
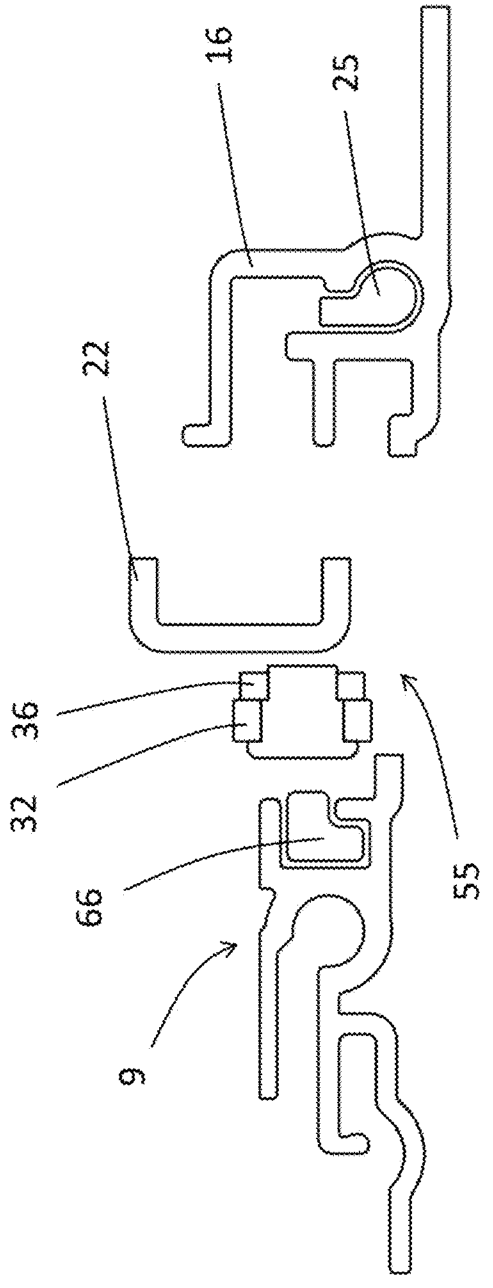
Figure 17:
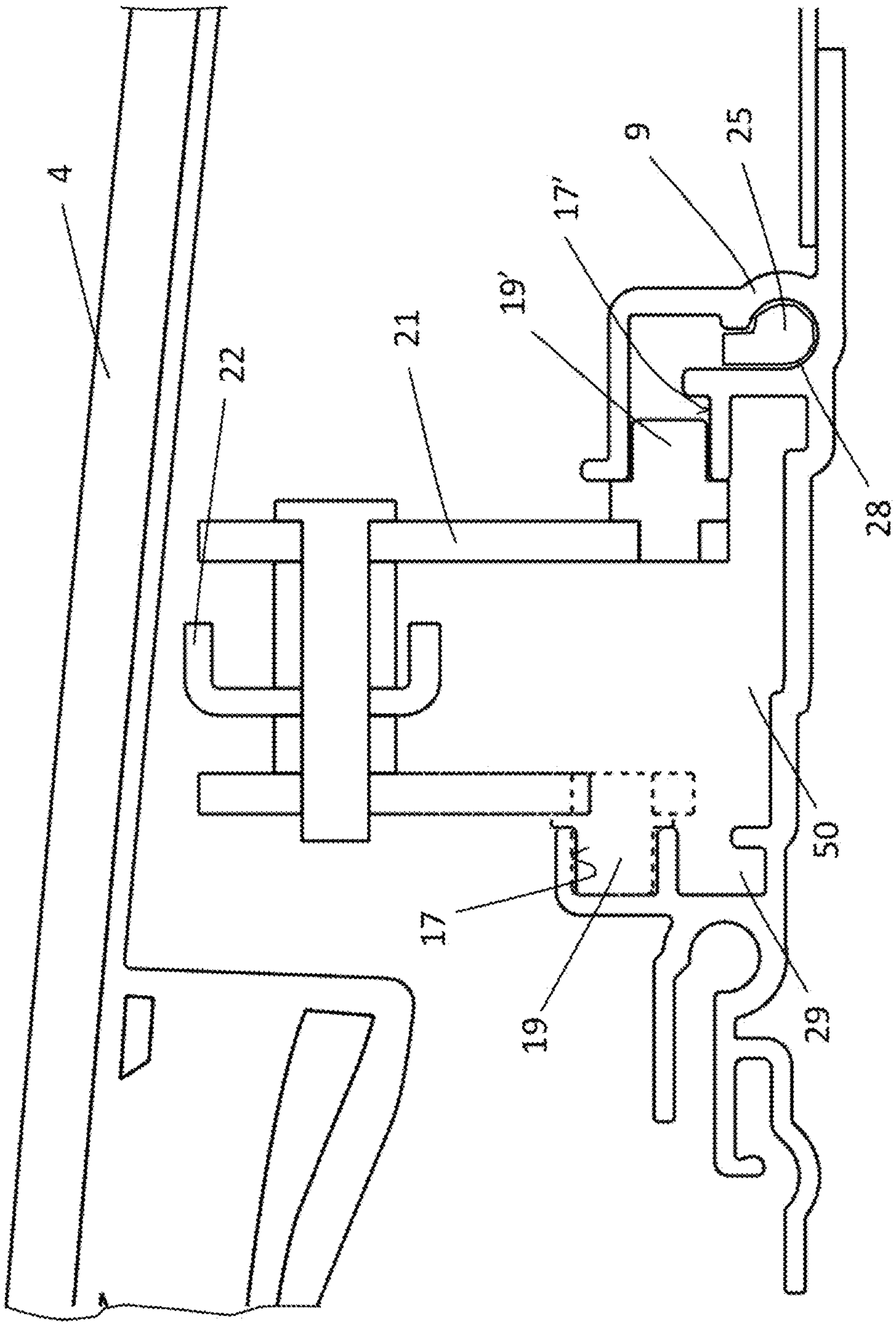
FIG. 17 is a sectional view taken across the guide rail with panel 4 in a slide position showing the front slide shoes.
Figure 18:
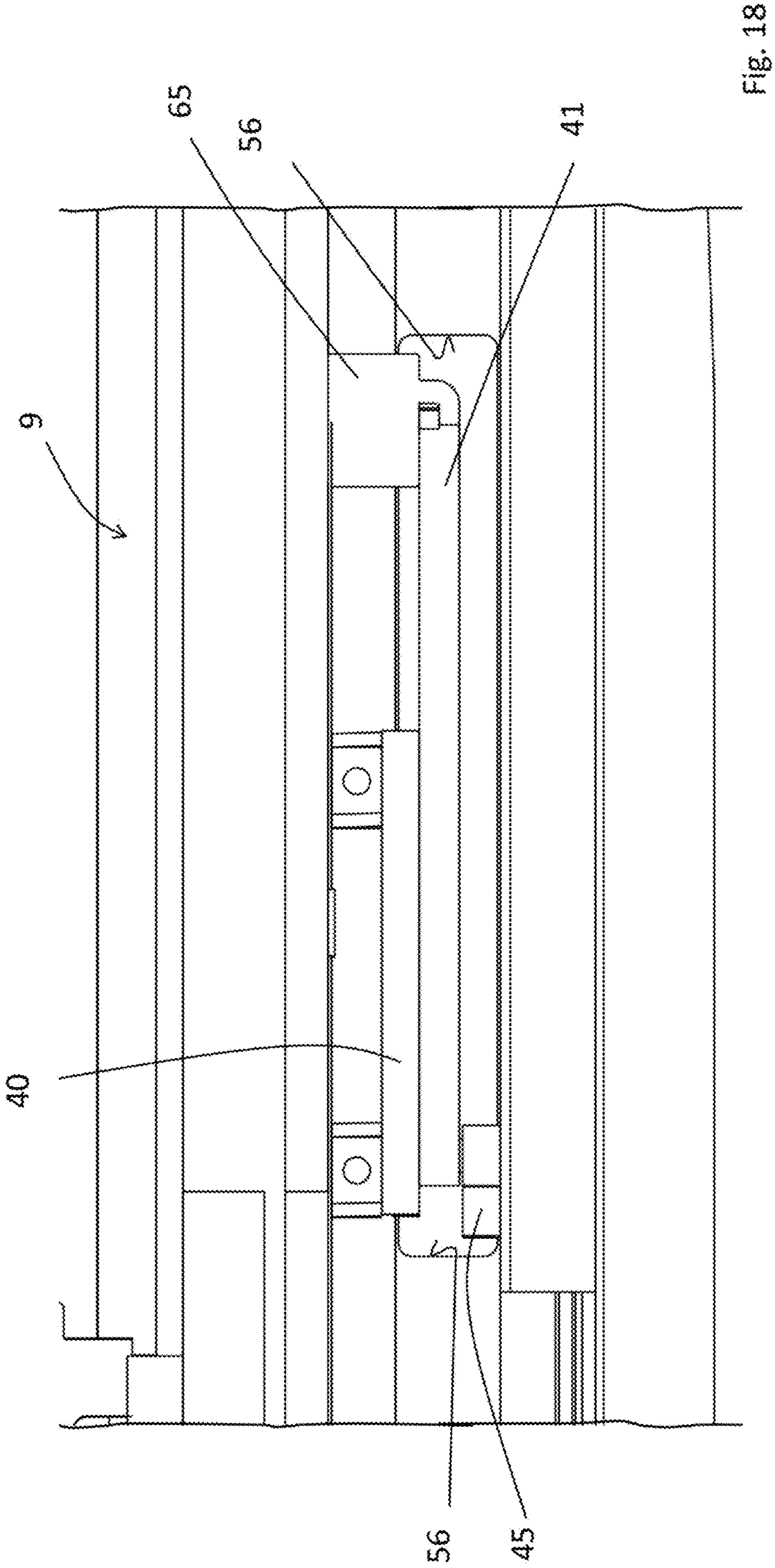
FIG. 18 is a plan view of a rear part of the operating mechanism showing the locking mechanism and part of the guide with a service hole.

Referring to FIGS. 3A and 3B, the front mechanism 20 comprises a driving slide 23, slidably guided in the guide rail 9 and driven by first drive members 12, 12' and is provided with a driving cam 51 cam which is slidably connected with a curve track 52 in a front lever 21, or in a curve of the panel brackets 22. This front lever 21, is hingeably connected by means of a pivot pin 13 to a pivot block 26 at its rear end (see FIG. 8) and at an opposite front end the front lever 21 is equipped with a pair of front slide shoes 19 that are slidably guided in guide grooves 17, 17' in the guide rail 9 and when the panel 4 is in closed position the slide shoes 19 are slidable guided in a downwardly extending pair of inserts 18 which also comprise the guide grooves 17,17' albeit in a curved shape. Slide shoes 19 are attached at lateral sides of front lever 21 and are seen in longitudinal direction, arranged in a staggered manner i.e., one after the other. The front end of the front lever 21 is hingeably connected with the front end of panel bracket 22. Said panel bracket 22 extends in longitudinal direction to the rear and is slidably connected to the tilting mechanism 24 via a slide claw 32. The panel bracket 22 is connected to panel 4 by means of screws 14. Basically, the driving slide 23 extends to the rear in longitudinal direction by means of a second drive member 25. Drive member 25 is basically an extension of the first drive member 12, 12', but in this case is a plastic part connected to the driving slide 23 and slidably guided in a guide channel 28 in the guide rail 9. Upon movement of the first drive member 12, 12', slidably guided in a guide channel 28 in the guide rail 9, in longitudinal direction to the rear, driving slide 23 moves to the rear and the driving cam 51 on the driving slide 23 moves to the rear in the curve track 52 of the front lever 21. The curve track 52 in the front lever 21 has a first part 52' which is substantially horizontal and so the driving cam 51 slides in the first part 52' of the curved track 52 such that the front lever 21 does not move. The rear end of the curved track 52 has a second part 52" in the shape of a radius in downward direction and the third part 52'" of the curve track 52 is substantially perpendicular to the first part 52' of the track 52. By continuing the rearward movement of the cam 51 in the curve track 52, the driving cam 51 arrives in the second part 52" of the track, hence the driving cam 51 gradually starts to pull the front end of the front lever 21 in an upward direction due to the radius shape of second part 52" and when the driving cam 51 arrives in the third part 52'", the cam 51 is "locked" in the third part 52'" and causing the lever 21 being pulled in a longitudinal rearward direction. The front lever 21 at its front end is hinge ably connected to the front end of panel bracket 22. Thus, upon a vertical movement of the front lever 21, induced by the second part 52" of the curved track 52, the front slide shoes 19 attached at the front end will move in an upward direction following the curved guide grooves 17, 17' in the inserts 18 and likewise the front end of the panel bracket 22 follows in the vertical movement, therewith raising the front edge of panel 4. Once the driving cam 51 of the driving slide 23 is in the third part 52" of the curved track 52, the front lever 21 is pulled rearwards and the slide shoes 19 of the front lever 21 will be slidably guided into the guide grooves 17, 17' of the guide rail 9 (see also FIG. 17) and thus be guided rearwardly in longitudinal direction and therewith the front lever 21 and the panel bracket 22. Thus, in this manner panel 4 will be opened gradually.

Figure 14:
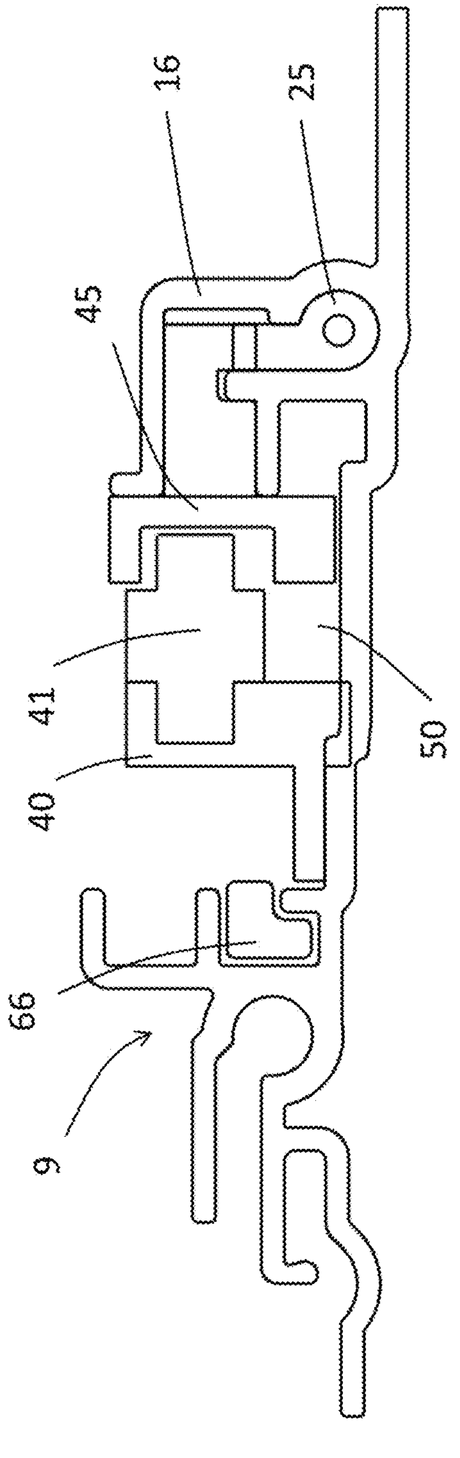
Figure 15:
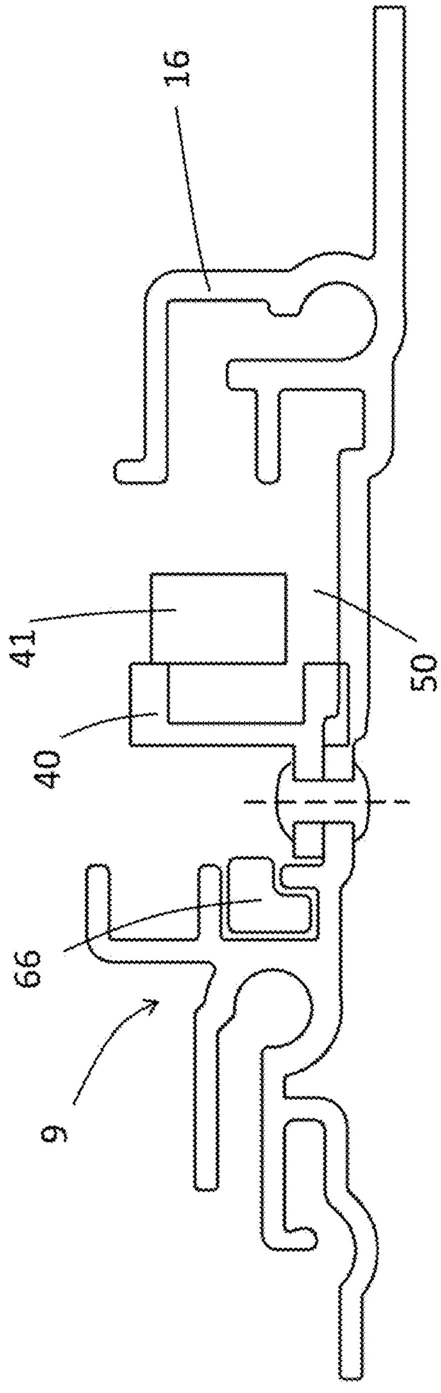
Figure 16:
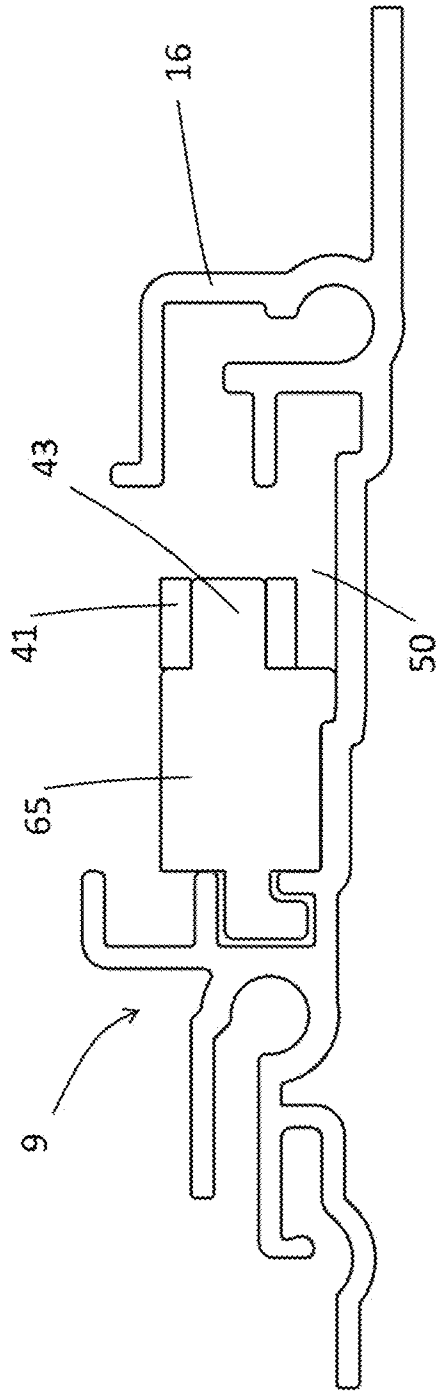
Figure 22:
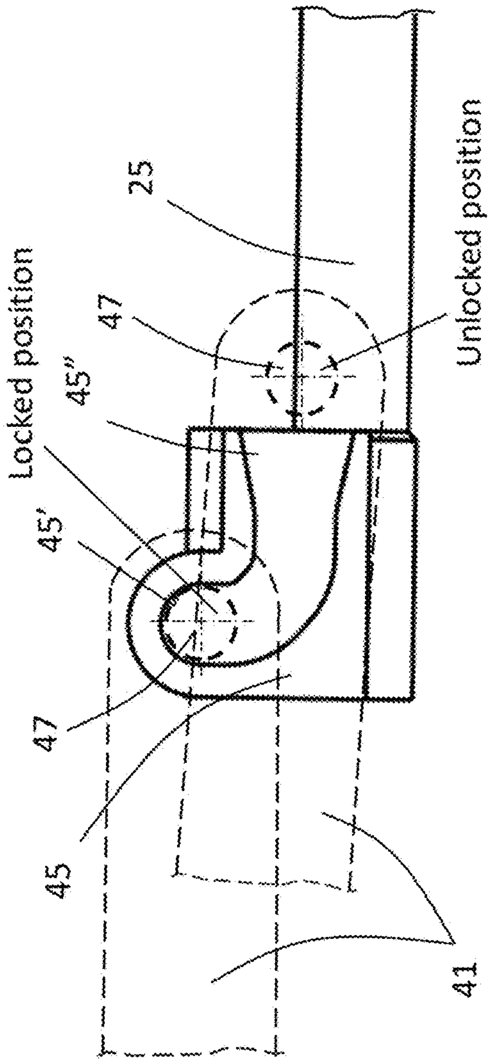
FIG. 22 is a true side view of the locking slot.
Figure 23:
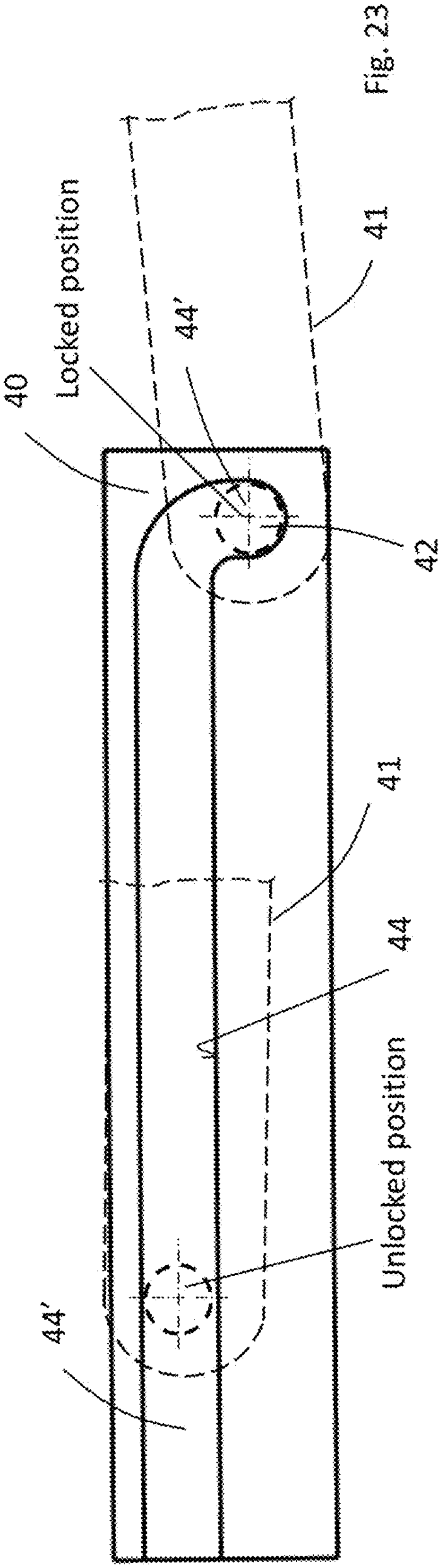
FIG. 23 is a true side view of the locator.

When panel 4 is in its closed position the tilting mechanism 24 is folded flat substantially within the guide rail 9 and (see FIGS. 9-13). Same as the locking mechanism 62 which is arranged in guide groove 50 (see FIGS. 14, 15 and 16). As can be seen from these figures, there is plenty of space for the arrangement of the locking mechanism 62 right at the center of guide rail 9. Second drive member 25 upon movement to the rear, slides in guide channel 28 rearwards. Second drive member 25 is releasably engaged with locking lever 41, and thus locking lever 41 slides to the rear too. Locking lever 41 is equipped with a locking cam 47 at its front end on one lateral side of the locking lever 41. Said locking cam 47 is engaged with a locking joint 45, in this embodiment a locking slot 45, at the end of the second drive member 25. The locking slot 45 has a catching portion 45" extending longitudinally from one open end into a locking portion 45' extending perpendicularly. The catching portion 45" is for catching the locking cam 47 when the roof panel is closing. A locking pin 42 is attached at the lateral opposite side of the locking lever 41. With reference to FIGS. 22 and 23, said locking pin 42 is slidably guided in a pin slot 44 of a locator 40. Locator 40 is fixedly attached to guide rail 9. Said pin slot 44 comprises basically two parts, whereby the first part 44' extends substantially in a horizontally longitudinal direction and the second part 44" extends perpendicularly to the first part 44' in, in this embodiment, a vertical downward direction. The locking lever 41 at its rear end, is pivotally connected to a hinge block 65.

Said hinge block 65 is slidably guided in guide groove 50 of the guide rail 9 and is further connected to a connecting rod 66 which rod extends towards the tilting mechanism 24 in another guide channel 29. Upon a continued movement rearward, the locking lever 41 and therewith the locking pin 42 will move rearward in the first part 44' of the pin slot 44. Because this first part extends substantially horizontally, the rearward movement of the locking lever 41 is continued uninterrupted via the hinge block 65 onto the connecting rod 66 towards the tilting mechanism 24. When the locking pin 42 moves into the second part 44" of the locking track 44, the locking lever 41 pivots around its hinge 43 at the hinge block 65 (see FIG. 16) and the front end of the locking lever 41 moves vertically in a downward direction, therewith decoupling the locking cam 47 from the locking joint 45, and thus from the second drive member 25.

In case drive member 25 is driven further rearwardly, it will continue to move without being connected to the locking lever 41. This means that the locking lever 41, being locked in the locator 40 does not further move the tilting mechanism 24 and the tilting mechanism is thus at the end of its vertical movement and is in this position stationary supporting panel 4.

Considering the operation of the tilting mechanism 24 from the closed position of the panel 4 towards the tilted position of the panel 4 whereby the rear of the panel 4 is lifted in vertical direction. Firstly, connecting rod 66 is moved rearwards in guide channel 29 as described before. Attached to the connecting rod 66 is the sliding guide 36. This sliding guide 36 comprises three guide slots 35, 35', 35". The auxiliary lever 63 is engaged to the sliding guide 36 by means of three guiding pins 64, 64' 64" slidably engaged with the three guide slots 35, 35', 35". Guide slot 35 is positioned at the front of the sliding guide 36 and comprises a horizontal slot portion 68 and an interconnected vertical slot portion 68'. Guide slot 35' is a slot which has a substantially horizontally extending slot 69 and third guide slot 35" of the sliding guide 36 comprises a first substantially horizontal portion 70 and a subsequent upwardly curved portion 70'. The auxiliary lever 63 additionally has a pivot pin 31 at the rear end of said lever pivotally engaging the slide claw 32. In other embodiments, the pivot pin may be connected to the lifting levers. Slide claw 32 has been provided with preferably plastic lining 34 (see FIG. 12B) which slidably circumvents the lower part of panel bracket 22 and the panel bracket guide 33. Slide claw 32 is pivotably connected to a pair of lifting levers 30, 30', which levers are at their opposite end pivotally connected to housing 27. Said housing 27 is fixedly connected to the guide rail 9. So, when the connecting rod 66 is being moved rearwardly, so moves sliding guide 36 rearwardly too.

Figure 21:
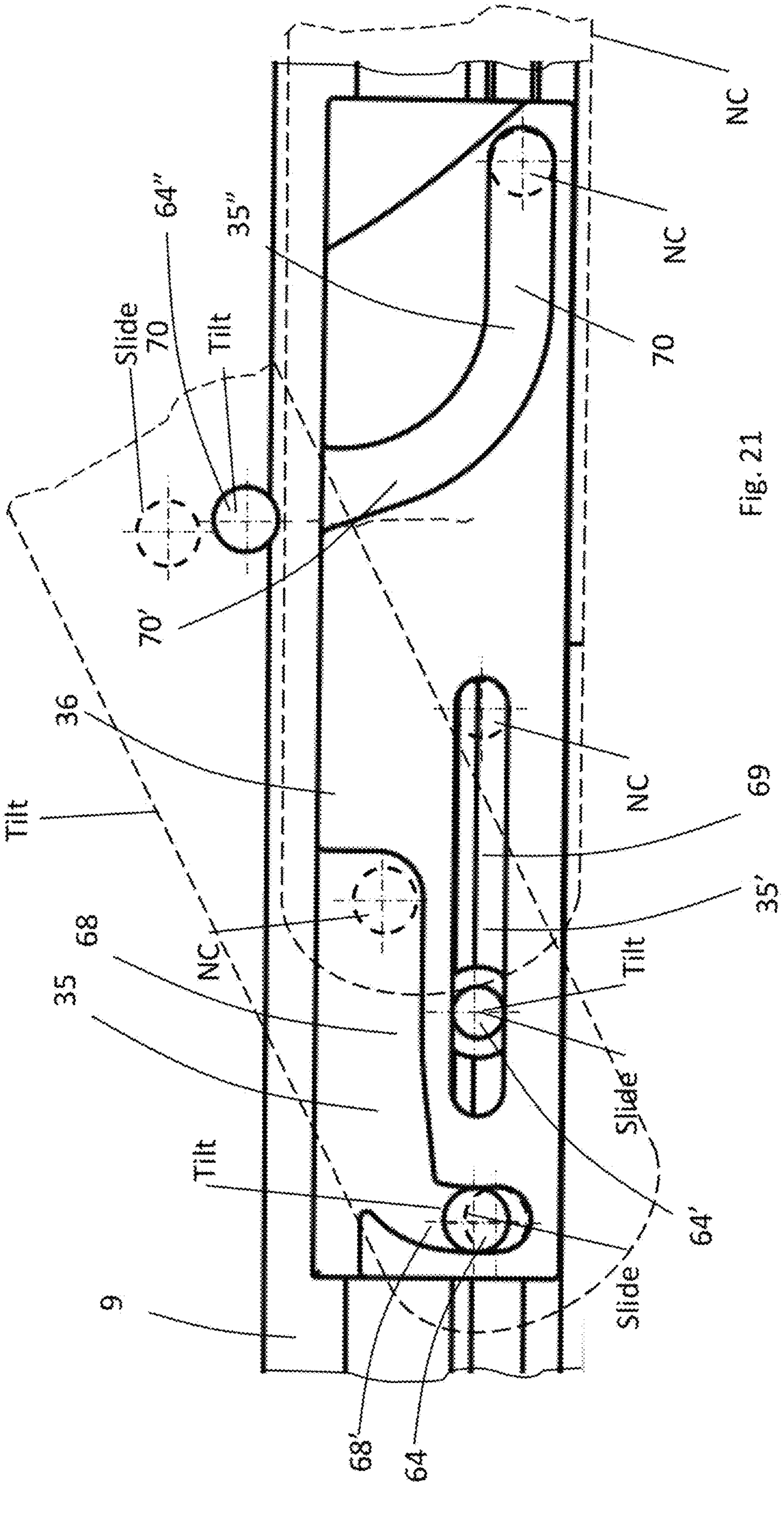
FIG. 21 is a true side view on the sliding guide looking from the lateral outward side towards the center of the vehicle.

Referring now to FIG. 21, due to the longitudinal movement of the sliding guide 36 the guiding pins 64, 64', 64" are forced to follow the shape of the guide slots 35, 35', 35". This means that from a longitudinal position in the guide rail 9 when the panel 4 is in its closed position, towards a position in which the panel 4 at its rear end is lifted, the auxiliary lever 63 is pivoted around a moving pivot point of guiding pin 64' in second guide slot 35' upwardly until the rear end of panel 4 has reached a lifted position. During this operation third guiding pin 64" is guided in third guide slot 35" in an upward direction into second portion 70', thus initializing the upward movement of the auxiliary lever 63 rearward of the moving pivot point of guiding pin 64'. First guiding pin 64 is during this operation guided firstly in the horizontal slot portion 68 of first guide slot 35 until secondly it reaches the vertical slot portion 68' in which first guiding pin 64 is guided in a downward direction. Although during the operation of lifting the rear end of the panel 4, first guiding pin 64 and second guiding pin 64' move in their respective guide slots 35, 35', third guiding pin 64" leaves the third guide slot 35" at the upper end of it. Once third guiding pin 64" is out of the third guide slot 35', the movement control and the support of the auxiliary lever 63 is taken over by the first guiding pin 64 in guide slot 35.

Regarding the vertical movement of the rear end of panel 4 it must be specified in detail that a defined "tilt" position is created in which the panel 4 has a lifted rear end but the front end of the panel 4 is still substantially closed. That means that the front end of panel 4 is still in contact with a seal 8 between the stationary part 7 and panel 4. This particular "tilt" position of panel 4 functions as a ventilation position in which the interior of vehicle 1 may be ventilated. Further when the panel 4 is driven from a "tilted" position to the rear of the roof, firstly the front end of the panel 4 will be lifted in an upward direction and the rear of the panel 4 is lifted somewhat more to a "slide" position and subsequently panel 4 is being moved to the rear of vehicle 1 thereby opening the roof opening 3.

Accordingly, from the above description it follows that the locking mechanism 62 in the locking position is unlocked from the front mechanism when the second drive member 25 is unlocked via the locking joint 45 from the locking lever 41. And that the locking mechanism 62 locks the tilting mechanism 24 when the third drive member 66 is locked via the locking lever 41 to the locking locator 40. Furthermore, the locking mechanism 62 in a sliding position is locked to the front mechanism 20 when the second drive member 25 is locked via the locking joint 45 to the locking lever 41 and unlocks the tilting mechanism 24 when the third drive member 66 is unlocked via the locking lever 41 from the locking locator 40.

Figure 24B:
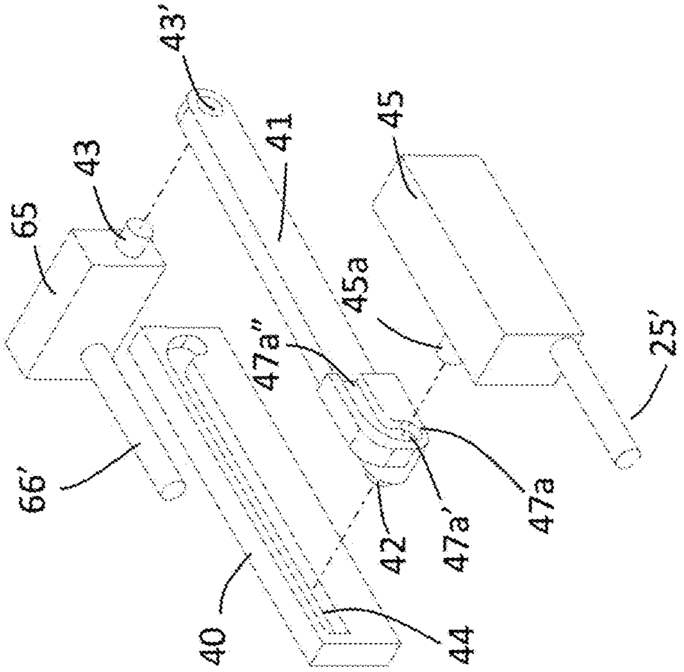
FIGS. 24A-D are exploded views of parts of alternative locking mechanisms of an operating mechanism.
Figure 24A:
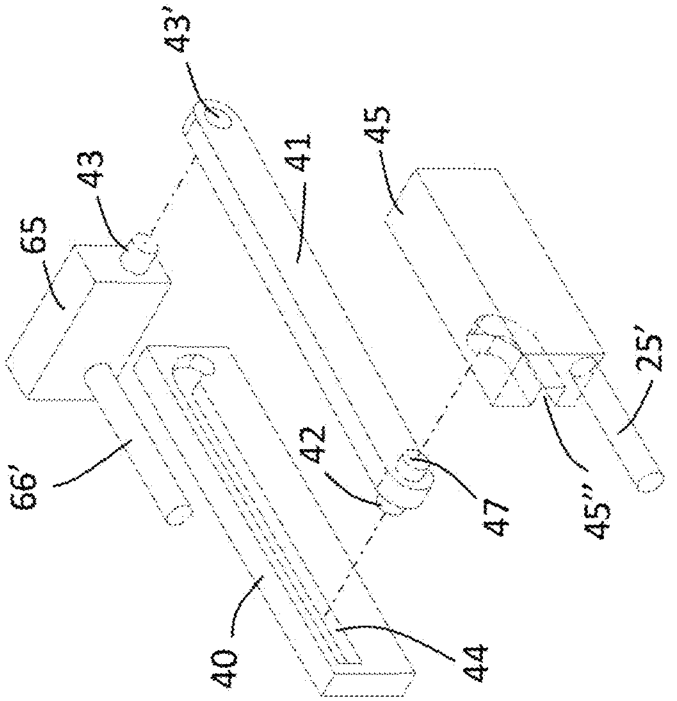

Referring to FIGS. 24A-D, alternative embodiments of the locking mechanism 62 are illustrated, where same elements have the same reference numbers. FIG. 24A shows the locking mechanism as described in detail in reference to FIGS. 22 and 23. In the embodiment of the locking mechanism of FIG. 24B, the elements for operating the locking joint i.e. cam 47 and locking slot 45 are replaced by or interchanged as a locking cam 45*a* and lever slot 47*a*. Herein the lever slot 47*a* includes a catching portion 47*a*" and a locking portion 47a'. The catching portion 47a" is for catching the locking cam 45a when the roof panel is closing. Whereas in the embodiment of the locking mechanism of FIG. 24C, the locking pin 42 of the locking lever 41 and pin slot 44 of the locator 40 are replaced by or interchanged as a locator cam 44a and lever slot 42a. As will be understood, alternative variants of joints may be constructed from different combinations of corresponding slots and pins, as for example also hinge pin 43 of hinge block 65 and connecting hinge hole 43' of locking lever 41 may be interchanged.

Figure 24D:
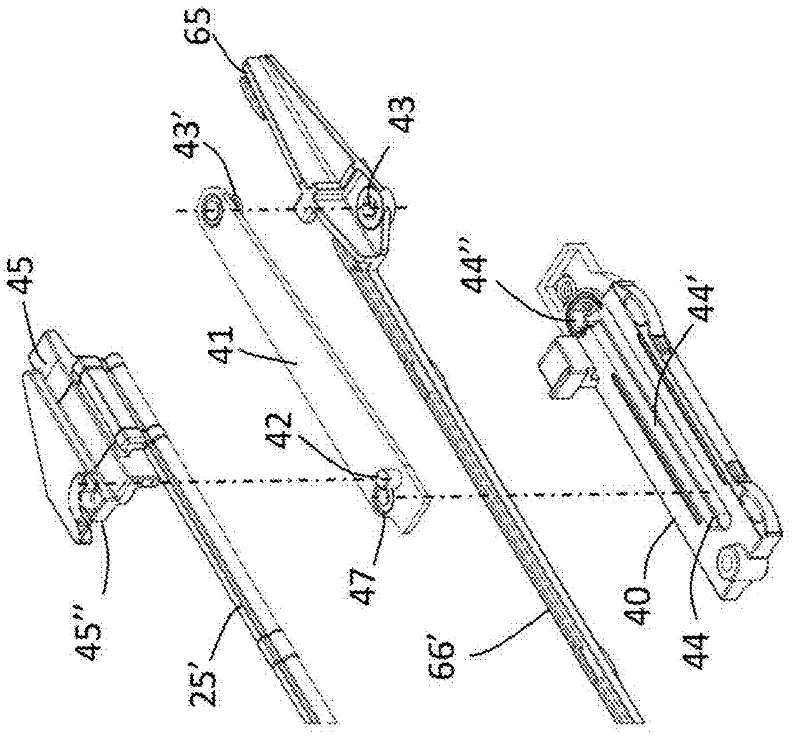
Figure 24C:
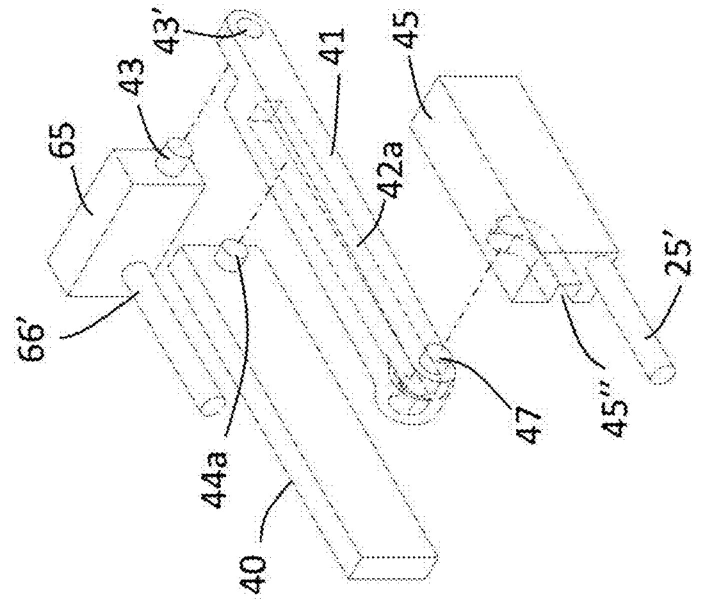

In the alternative embodiment of the locking mechanism 62 illustrated in FIG. 24D, the orientation of the locking mechanism, and therewith various pins and slots, is rotated about 90° degrees in comparison to the embodiments of FIGS. 24A-C. Accordingly, in this embodiment the pin slot 44 still comprises two parts, the first part 44' extending in a longitudinal direction and the second part 44" extends perpendicularly to the first part 44', yet in a transverse, cross car direction instead of vertical a direction as in FIGS. 24A-C. Similar elements of FIGS. 24A-D have the same reference numbers and the description of these FIGS. correspondingly applies. As will be understood, all variants of FIGS. 24A-C may be adapted in orientation of the locking mechanism similar to that as in FIG. 24D. Hence, various mutations may be possible. With respect to the embodiment of FIG. 24D, the illustrations of FIGS. 22 and 23, may be regarded as a bottom view instead of a side view, wherein the operation of elements is similar. FIGS. 22 and 23 may also illustrate a top view of a different rotated embodiment, for example an embodiment mirrored with regard to that of FIG. 24D, such as e.g. one suited to be positioned at an opposing side of the pair of guide rails.

Thus, in general the locking mechanism includes a locking joint mounted at an outer end of the second drive member, a hinge block at an outer end of the third drive member, a locking locator fixedly attached to the guide rail, and a locking lever slidably guided by the locking locator. The locking lever is further pivotally connected at one end to the hinge block and releasably coupled at an opposite end with the locking joint. Accordingly, the locking lever is movable between a sliding position and a tilt locking position via movement of the second drive member. In the sliding position, the locking lever is unlocked in the locking locator and locked in the locking joint, while in the tilt locking position, the locking lever is locked in the locking locator and decoupled from the locking joint. With the locking lever in the tilt locking position, the locking mechanism locks the tilt mechanism to the guide rail. Hence, the locking mechanism is in a locking position. While with the locking lever in the sliding position, the locking mechanism unlocks the tilt mechanism from the guide rail. Hence, the locking mechanism is in a sliding position.

Figure 3C:
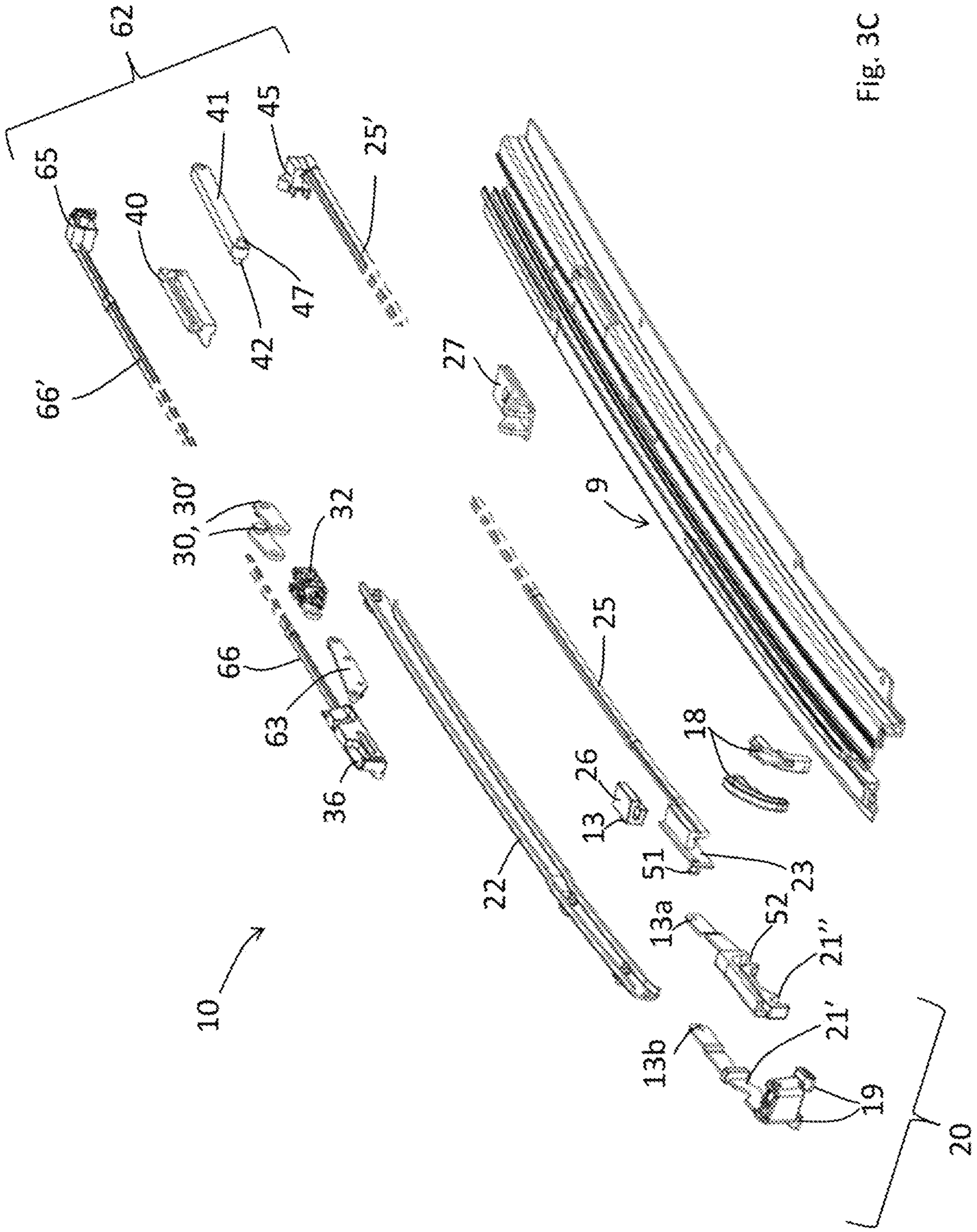
FIGS. 3C and 3D are exploded views of the parts of an alternative operating mechanism for the panel of the roof system of FIG. 2, viewed from the laterally outside and inside.
Figure 3D:
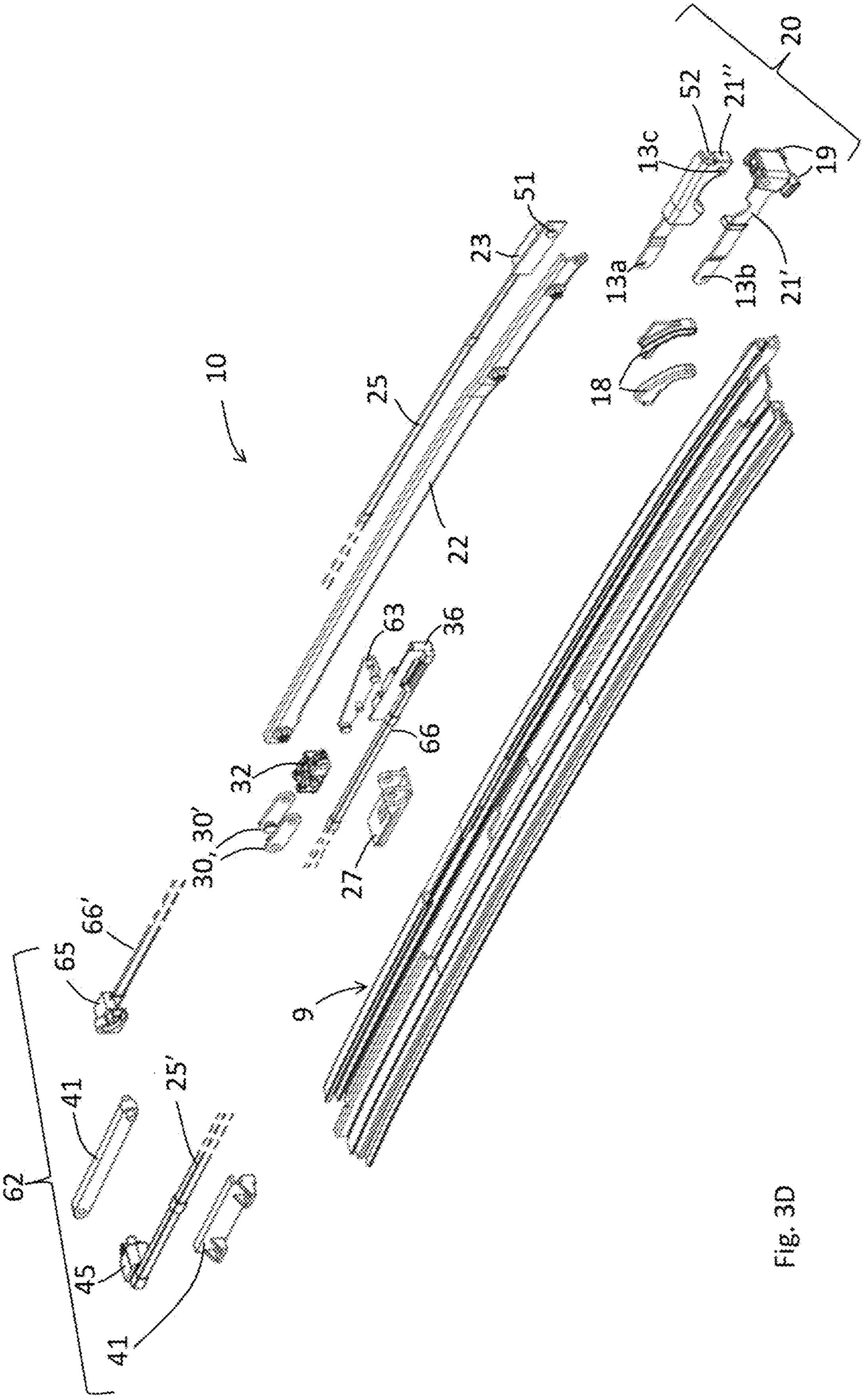

Referring to FIGS. 3C and 3D, another embodiment of the operating mechanism 10 is illustrated. The tilting mechanism 24 and locking mechanism 62 may be the same as in FIGS. 3A and 3B, or be embodied as one of the alternatives as described. The middle portion between front and rear portions of both the second drive member 25, 25' and third drive member 66, 66' respectively are illustrated with intermittent lines, the length of which will be such as to accommodate the distance desired for locating the tilting mechanism 62 in the extended guide rails 9. In the embodiment of FIGS. 3C and 3D, wherein the front mechanism 20 is constructed alternatively in that front mechanism 20 includes two front levers 21', 21". A first front lever 21' has slide shoes 19 that cooperate with guide grooves in the guide 9 and inserts 18 as described above. A second front lever 21" has the curve track 52 that cooperates with driving cam 51 of the driving slide 23 that is slidably guided in the guide rail 9'. The first front lever 21' is pivotally connected by means of a pivot hole 13b to a pivot pin 13c of the second front lever 21". The second front lever 21" is pivotally connected by means of a pivot hole 13a to pivot pin 13 of the pivot block 26. In this manner, the first front lever will provide the sliding movement of the panel in and out of the closed position. And the second front lever will provide the vertical lifting or pivoting movement of the panel. Thus, basically, at least one front lever is operatively joined to the front lever, e.g. by a cam-curve joint or slot and pin joint, and pivotally connected to a pivot block. And at least one front lever is arranged for lifting and pivoting the front edge of the first panel relative to the guide rail by driving of the driving slide, in particular by operating the first drive member. Hence, the overall functionality of the front mechanism 20 and build up is the same for both embodiments, as described throughout the description.

Figure 3E:
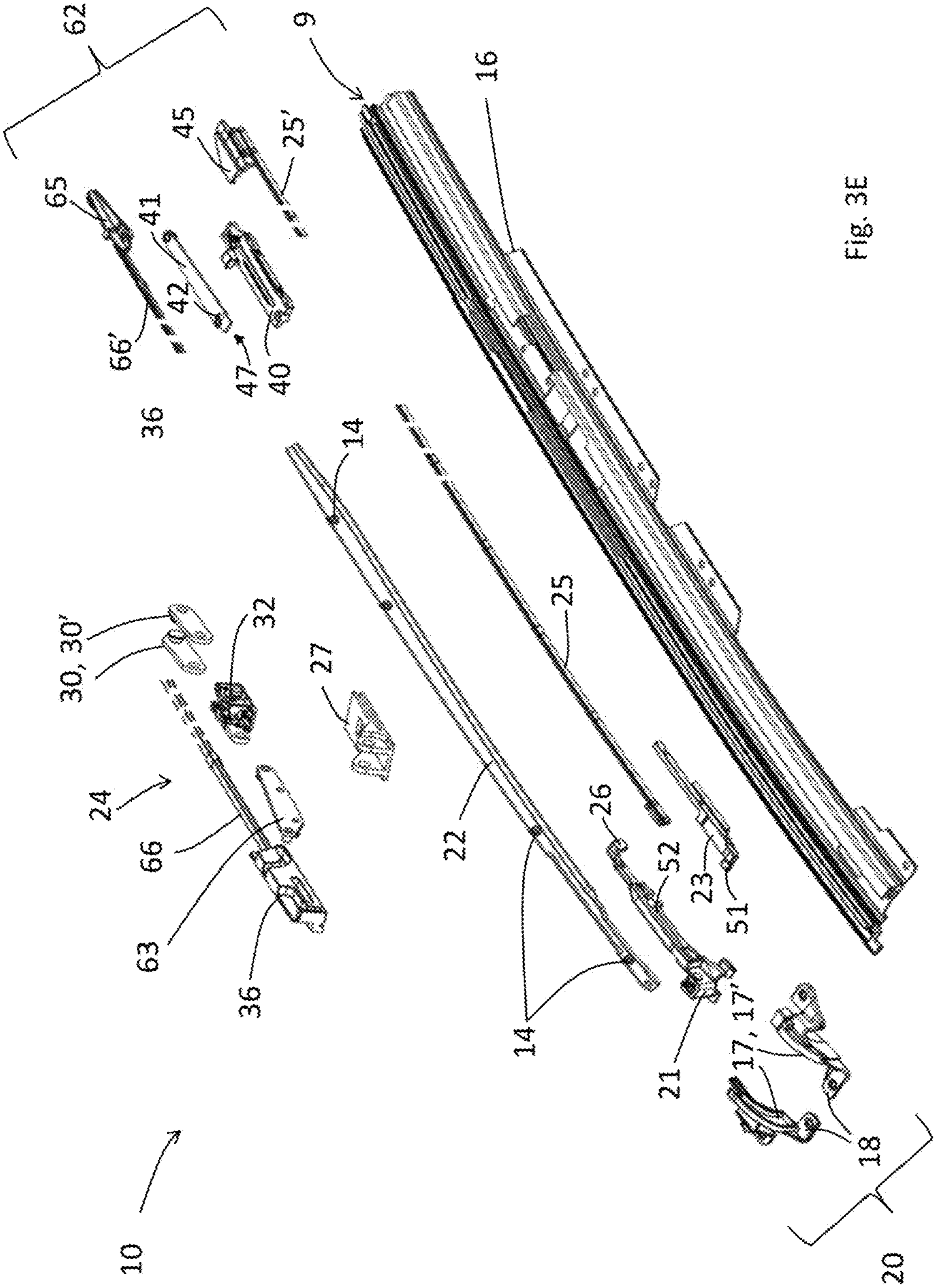
FIG. 3E is an exploded view of another alternative operating mechanism for the panel of the roof system of FIG. 2, viewed from the laterally outside.
Figure 4:
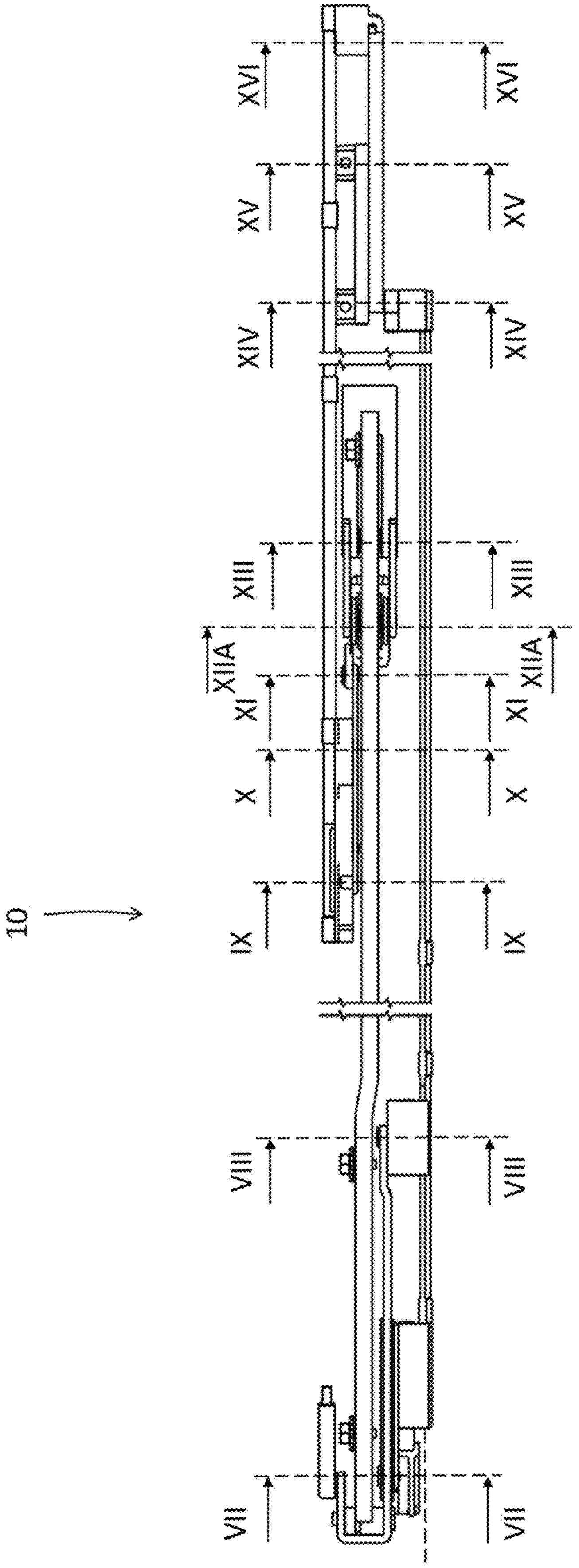
FIG. 4 is a plan view of the operating mechanism of FIG. 3 without the guide rail in which it is mounted.
Figures 5A, 5B, 5C:
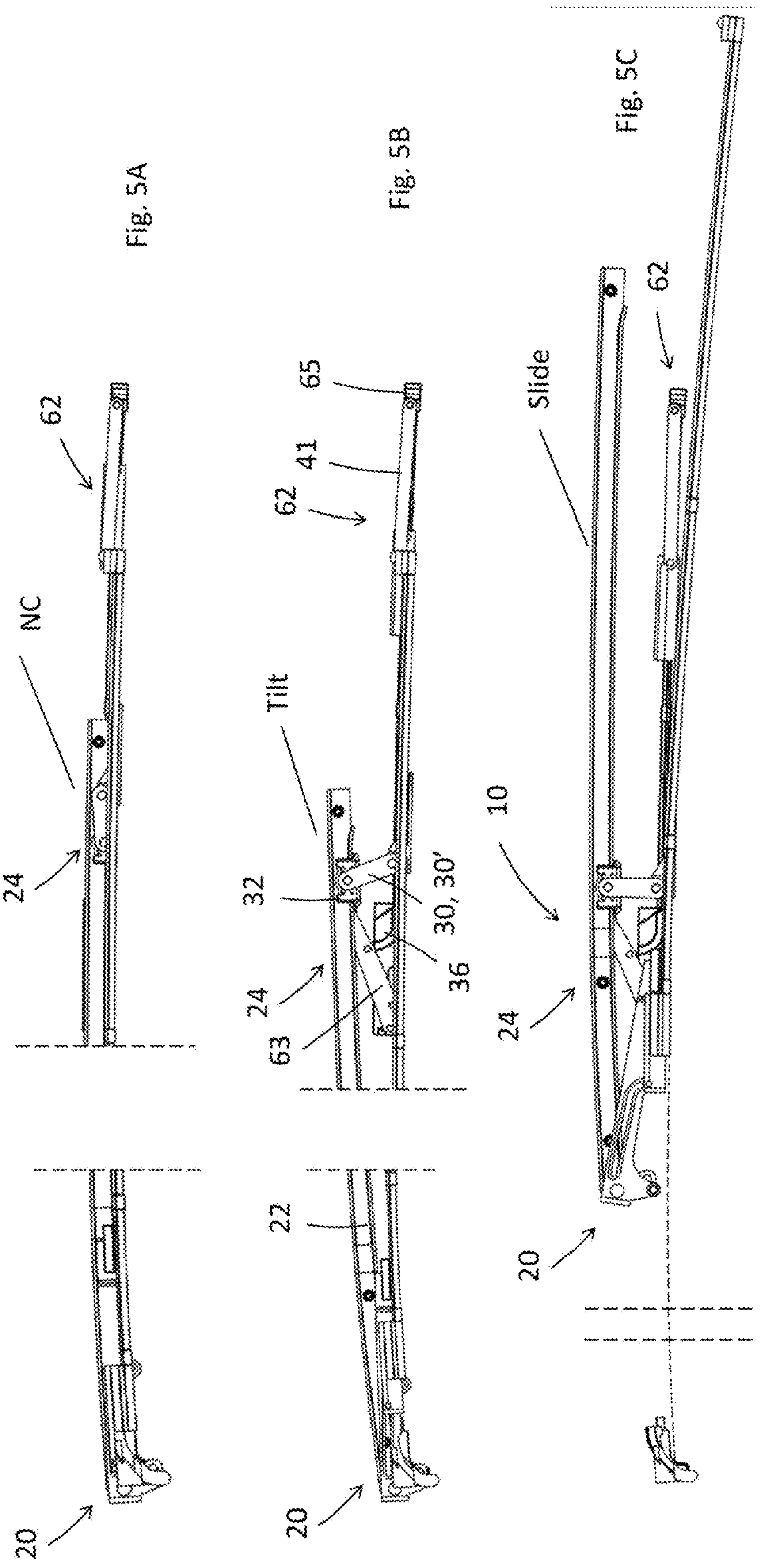
FIGS. 5*a*-5*c* and 6*a*-6*c* are side views from the outside and the inside of the operating mechanism of FIG. 4 in three different positions without the guide rail.
Figures 6A, 6B, 6C:
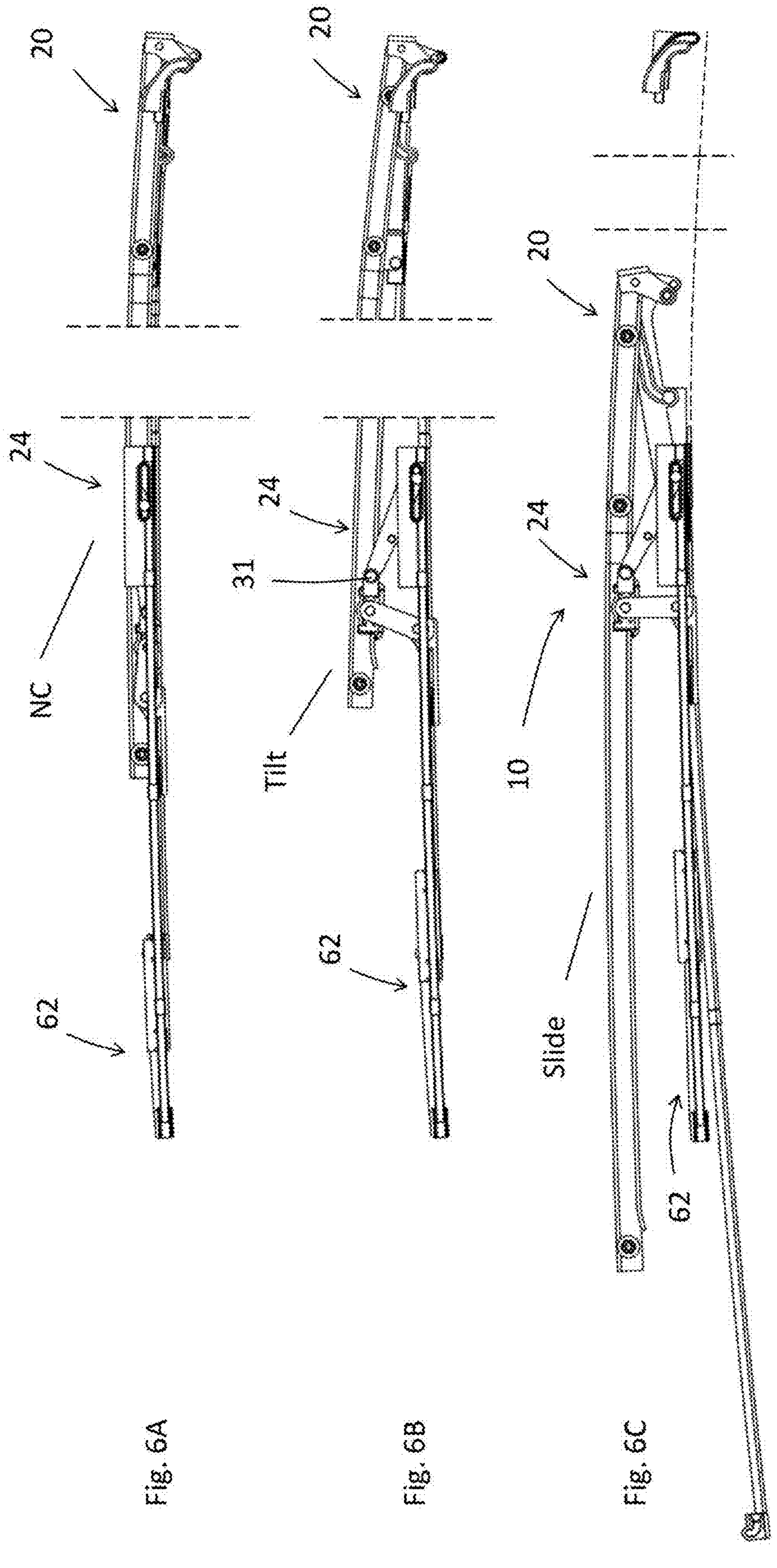
Figure 7:
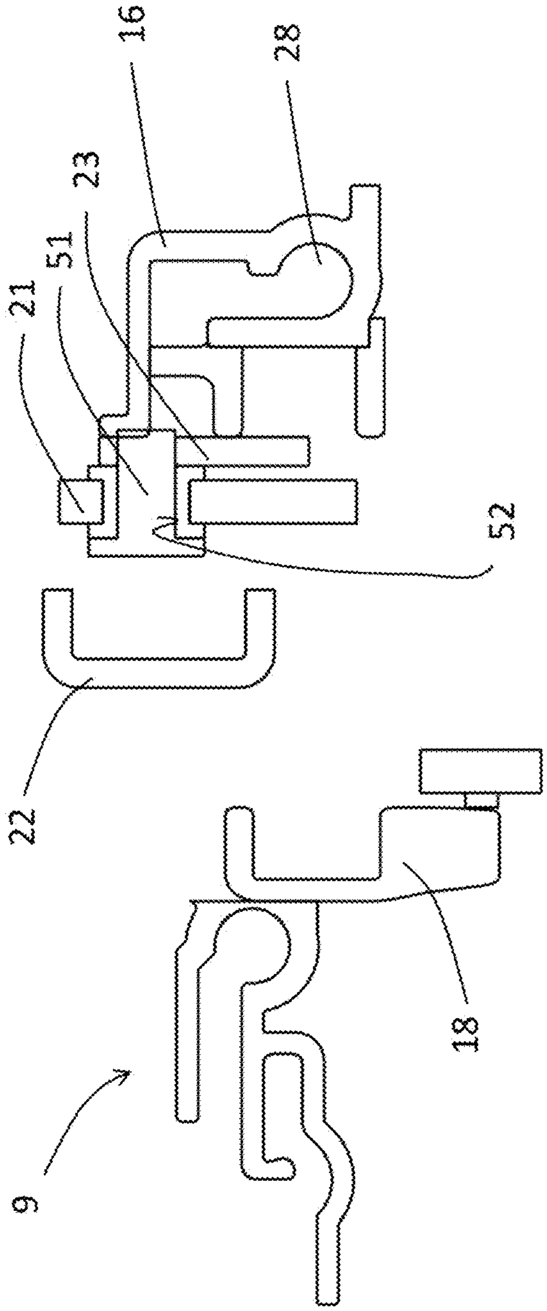

Referring to FIG. 3E, another embodiment of the operating mechanism is illustrated. Similar elements have the same reference numbers as in FIGS. 3A-D. The tilting mechanism 24 is constructed as described in relation to FIGS. 3A-D. In the embodiment of FIG. 3E, the locking mechanism 62 is constructed alternatively in that it is rotated 90° about an axis parallel to the longitudinal direction, as explained above in detail with reference to FIG. 24D. The operation is the same, that is when the second drive member 25 moves rearward, the third drive member 66, 66' is moved along while the locking cam 47 is maintained in the locking slot 45 by the locking pin 45 of the locking lever 41 travelling through the locking locator 40. When the locking pin 45 travels into the perpendicular, transverse portion of the locking locator 40, thereby decoupling the locking cam 47 from the locking slot 45 as it travels into a transverse portion of that locking slot 45, the second drive member 25 may travel further rearwardly while the third drive member remains stationary.

Furthermore, in the embodiment of FIG. 3E, the front mechanism 20 is also constructed alternatively. Instead of a pivot pin 13, the pivot block 26 has an outer curved contour allowing it to pivot over a curved bottom and/or curved top surface. The driving slide 23 connected to the second drive member 25 will be driven by first drive members 12, 12' (see FIG. 3), and will operate the front lever 21 via driving cam 51 similarly as explained above.

Referring to FIGS. 3, 12A, 12B, 13 and 14, guide rail 9 is provided with a first and a second hole 55, 56. First hole 55 is positioned underneath the tilting mechanism 24 and provides space in vertical direction for the tilting mechanism 24 parts when the panel 4 is in its closed position and the tilting mechanism 24 is folded substantially within the boundaries of the guide rail 9. Due to hole 55, slide claw 32 and housing 27 may be packaged in vertical sense somewhat lower compared to when these parts would have been mounted on top of the guide groove 50. The second hole 56 lies beneath locking mechanism 62. Especially when the second panel 4' is mounted by gluing, it would be very expensive to remove the glued panel in order to apply service to the locking mechanism 62. To avoid this a cheaper solution is to use hole 56 for service of the parts of the locking mechanism 62 from below.

The roof system may further comprise a drain channel 67 to drain water that may leak between the first and second panel 4, 4'. As shown in FIG. 2, the drain channel 67 usually extends in lateral direction underneath the seal that is fitted between the first and second panel 4, 4'. The drain channel 67 functions as a gutter that collects water that may drip through the sealing and that drains the water to the lateral sides of the drain channel 67 into the wet area of the guide rail 9. The locking mechanism 62 may be placed in the guide rail 9 at least partly underneath the drain channel 67 seen in vertical direction.

Referring to FIG. 19 and FIG. 20, a section across the roof system is taken along lines XIX and XX in FIG. 2. In FIG. 19 stationary part 7 is shown to which guide rail 9 is attached and whereby the stationary part 7 is connected to the body flange 5 by means of glue. In this figure the stationary part 7 lies on top of the body flange 5. This is normal with this type of top loaded roofs, which are assembled from the top onto the body. Guide rail 9 has a certain distance relative to the body flange 5 seen in lateral direction. In FIG. 20 the guide rail 9 is closely adjacent to the body flange 5. The stationary part 7 is shaped such that it connects to the middle of the guide rail 9, because there is no space left to make the connection on the flange of the guide rail 9 that is adjacent to the body flange 5. The reason for this is that the guide rail 9 is moved laterally outward as much as possible towards the body flange 5 to increase the daylight opening of the roof system. However, in current bodies the roof (i.e., the so-called cant-rail) is extending in a tapered shape towards the rear of the vehicle. In some embodiments it may be preferred to have the guide rail 9 extending in a straight longitudinal direction seen in a plan view. Guide rail 9 is non-parallel to the cant-rail line and therewith the body flange 5, thus the guide rail 9 will approach the body flange 5 closely in the rear of vehicle 1. It is even conceivable that the guide rail 9 is reduced in width by cutting of the laterally outward flange.

Figure 25:
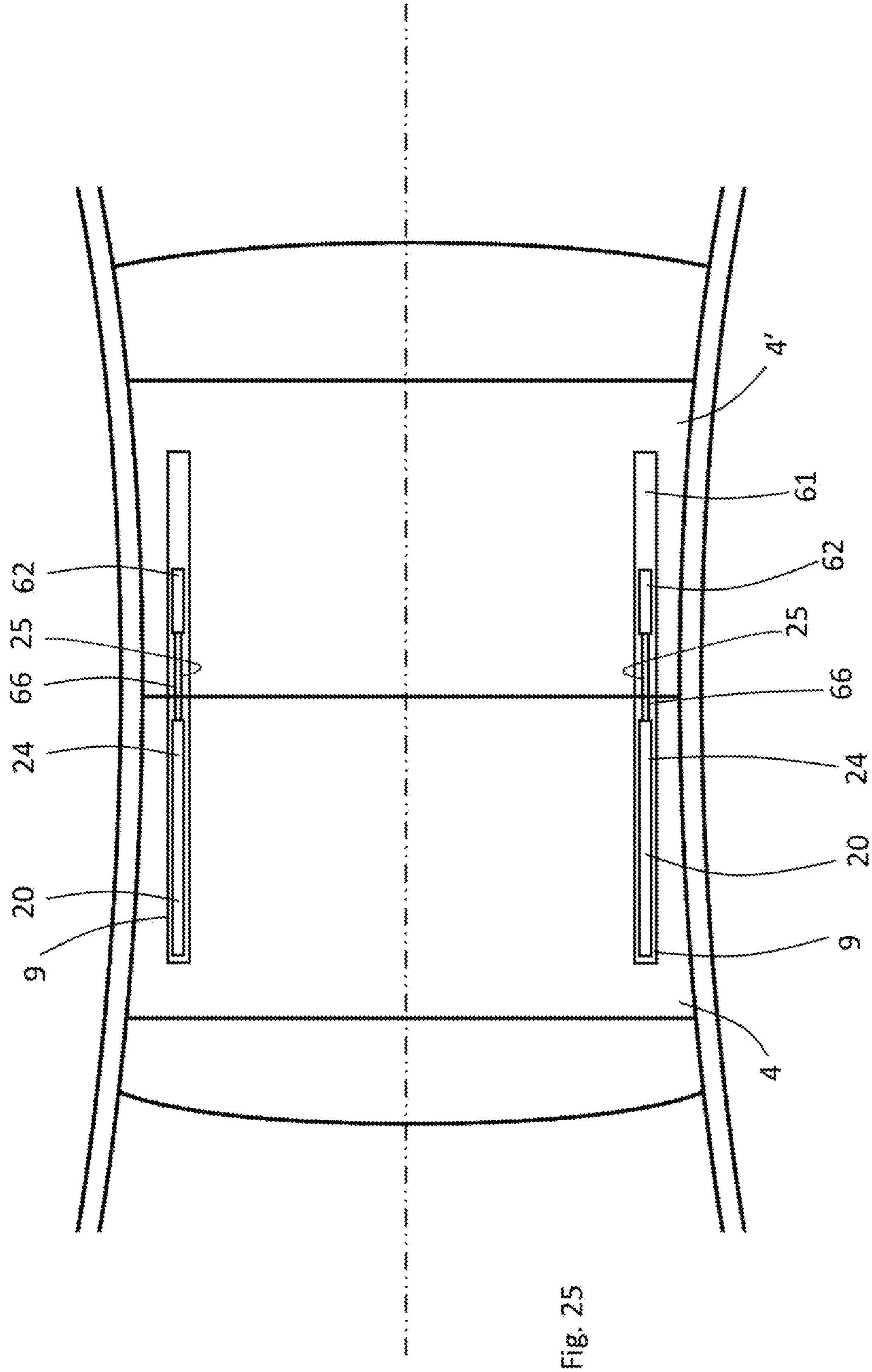
FIGS. 25-28 are schematic plan views of the operating mechanism and several embodiments of the guide rail geometry in different embodiments of the roof system having at least a movable first panel.

Referring to FIGS. 25-28 which are plan views of a fixed roof 2 of a vehicle with schematic operation mechanism 10 and guiderails 9 in several embodiments are shown. In FIG. 25 a fixed roof 2 of a vehicle 1 is shown with a top loaded roof system having a first and a second panel 4, 4'. The operating mechanisms 10 are schematically shown with solid lines (for clarity) below the surfaces of the panels 4, 4'. In this first embodiment the guide rails 9 extend from front to rear as one piece on left and right lateral sides of the roof opening 3.

Figure 26:
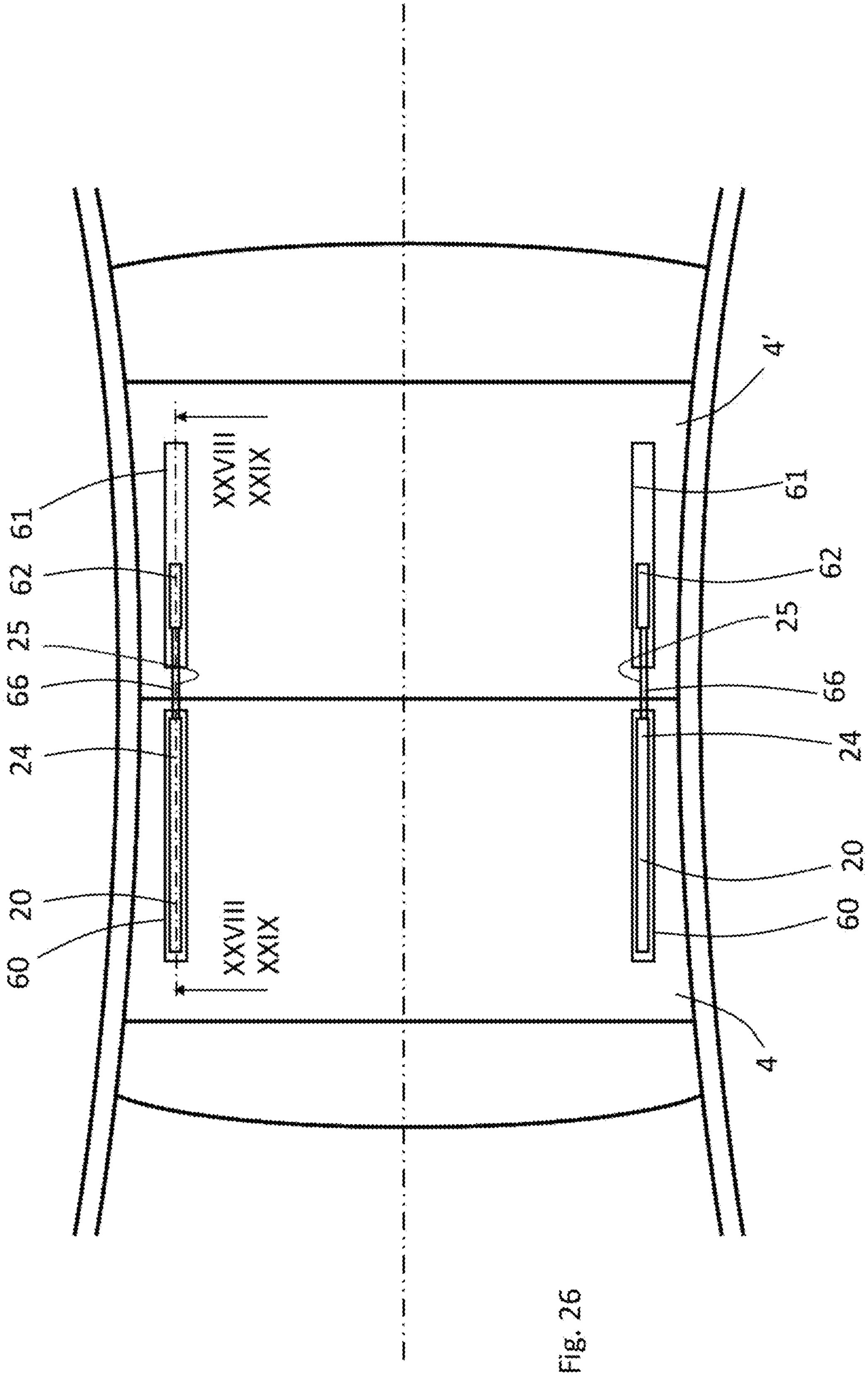
Figure 29:
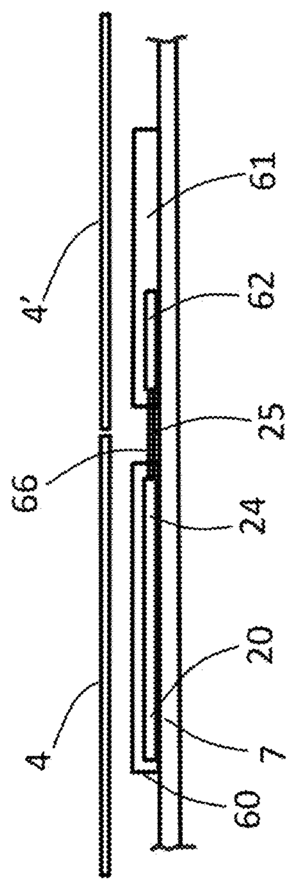
FIGS. 29-31 are schematic sectional views of the operating mechanism according to respective lines XXVIII-XXVIII, XXIX-XXIX, XXX-XXX in FIGS. 26, 27, 28.
Figure 30:
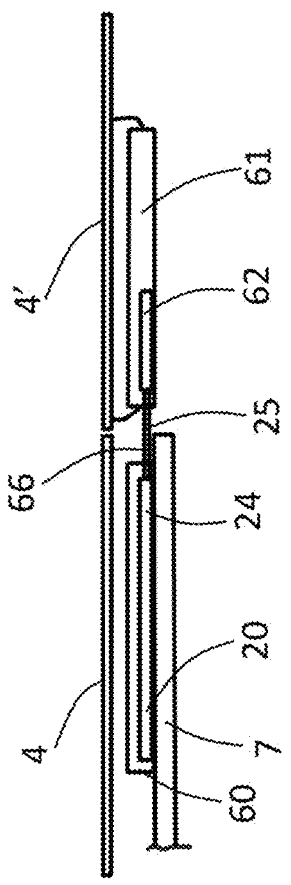

In FIG. 26 a similar fixed roof 2, first and second panels 4, 4' and operating mechanisms 10 are shown, shown with solid lines (for clarity) below the surfaces of the panels 4, 4', however in this embodiment the guide rails 9 are split up in two parts. Front guide rail 60 and rear guide rail 61 each slidably guide a part of the operation mechanism 10. It is clear from FIG. 26 that a distance between the front and the rear guide rail 60, 61 is created, precisely in the area where typically a cross member of the body of the vehicle could extend in a transverse direction. Rear guide rail 61 may be fixed to the stationary part 7 such as in FIG. 29, however it is conceivable that the guide rail 61 is fixed against an inner portion of the second panel, such as in FIG. 30.

Figure 27:
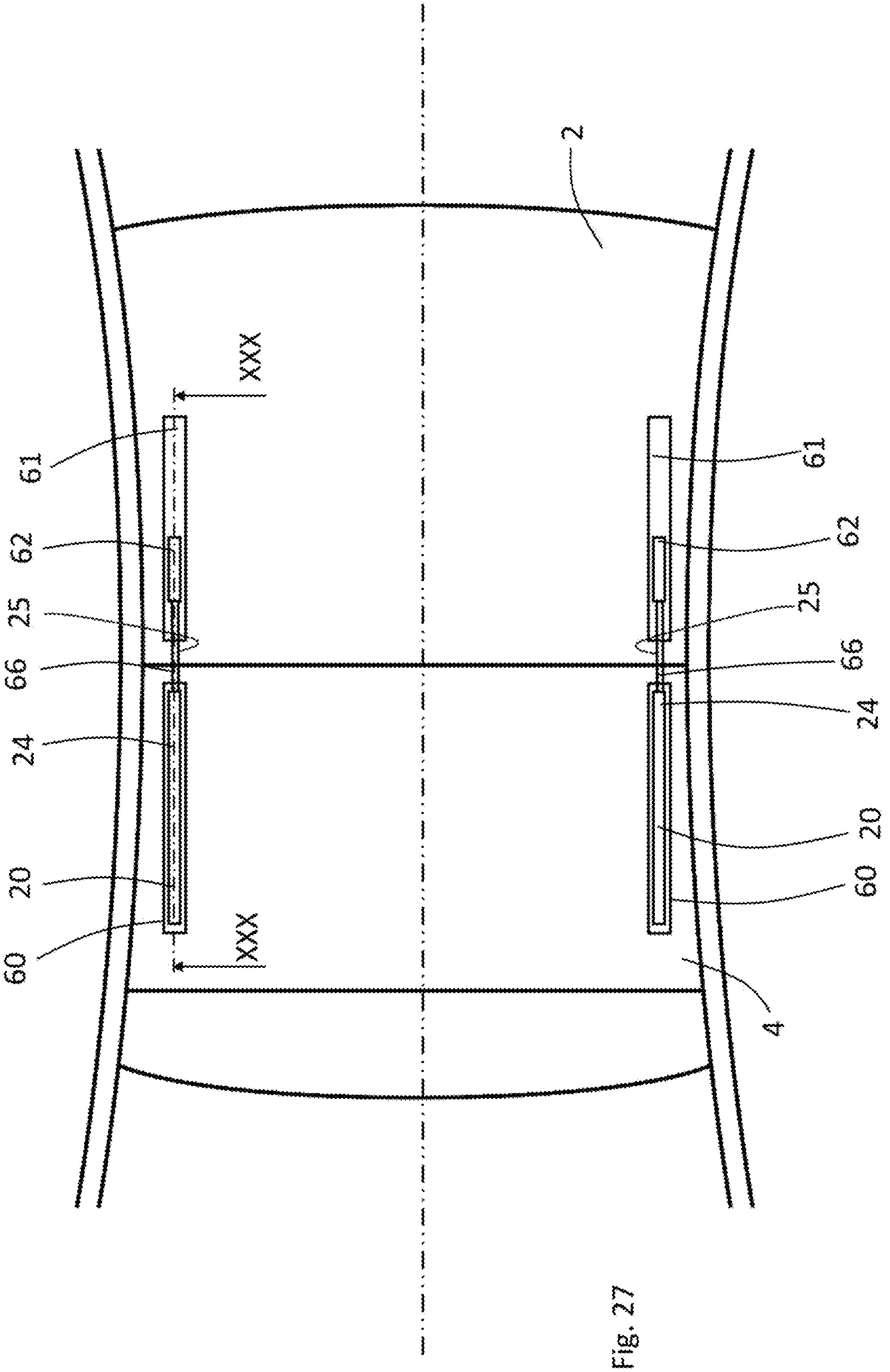

FIG. 27 shows an example of a top loaded roof system having just one first (movable) panel 4 and an operating mechanism 10, shown with solid lines (for clarity) below the surfaces of the panel 4 and fixed roof 2, guided in the front and rear guide rails 60, 61. The part of the vehicle roof rear of the first panel 4 is the steel fixed roof 2. The rear guide rails 61 are fixedly attached to an inner portion of the fixed roof 2 such as shown in FIG. 31.

Figure 28:
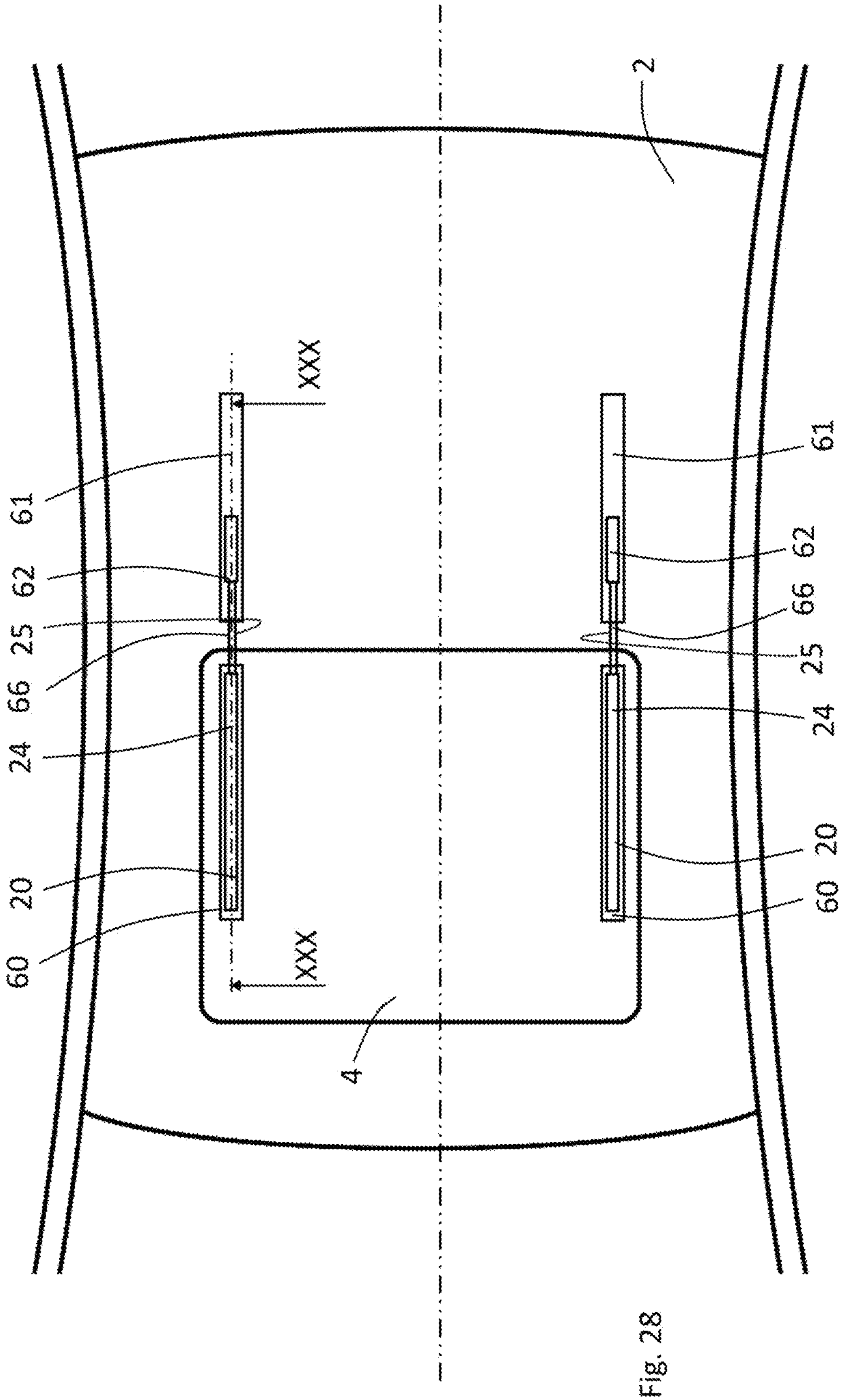
Figure 31:
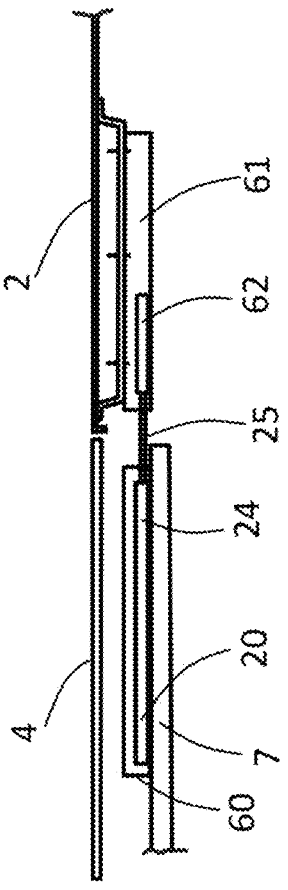

FIG. 28 shows an example of a bottom loaded roof system having just one first panel 4, and whereby the rear guide rail 61 is also fixedly attached to an inner portion of the fixed roof 2 such as shown in FIG. 31. Operating mechanism 10 is shown with solid lines (for clarity) below the surfaces of the panel 4, and fixed roof 2.

All of the parts of the operating mechanism 10 and the various embodiments of the guide rails 9, 60, 61 are drawn up in the respective figures and are described in this document mostly on one (left or right) side of the roof system. It should be understood that the roof system is equipped with left and right operating mechanisms 10 and left and right guide rails which are mirror imaged to each other.

The invention is not limited to the embodiments described before and shown in the drawings which may be varied widely within the scope of the invention as defined by the appended claims. In principle, it would be possible to combine features of the various aspects and embodiments shown and described.

What is claimed is:

1. A roof system for a vehicle having a roof opening in a fixed roof, comprising:

a stationary part configured to be attached to the fixed roof;

a first panel movably supported on the stationary part and configured to close the roof opening in its closed position and to be moved at least rearwardly to an opened position in which the roof opening is at least partly opened, the first panel having a front edge and a rear edge;

a pair of guide rails extending in a longitudinal direction and configured to be substantially parallel to opposite lateral sides of the roof opening;

an electric motor operably connected to first drive members; and an operating mechanism for the first panel, the operating mechanism being connected to and driven by the electric motor and the first drive members, wherein at least part of the operating mechanism is slidably supported on said guide rails, the operating mechanism comprising:

a front mechanism configured to move the front edge of the first panel in a vertical direction and move at least a part of the operating mechanism in the guide rail in the longitudinal direction, the front mechanism including a panel bracket, attached to the first panel;

a tilting mechanism configured to move the rear edge of the first panel in a vertical direction, the tilting mechanism including a slide claw in slidable contact with the panel bracket; and a locking mechanism configured to lock the tilting mechanism to the guide rail in order to keep the tilting mechanism stationary with regard to the guide rail to enable the first panel to slide with respect to the tilting mechanism, wherein the locking mechanism is slidably guided in the guide rail and is completely rearward of and remote from the tilting mechanism seen in a longitudinal direction of the vehicle.

2. The roof system for a vehicle according to claim 1, wherein the locking mechanism comprises a locking lever and a locator, wherein the locator and locking lever comprise a pin slot and a locking pin slidably guided in the pin slot; and wherein the locator is fixedly attached to the guide rail; and wherein the pin slot has a first substantially longitudinal portion for guiding the locking pin and a second substantially perpendicular locking portion to lock the locking pin.

3. The roof system for a vehicle according to claim 1, wherein the guide rails extend uninterruptedly in the longitudinal direction and wherein the front mechanism, the tilting mechanism and the locking mechanism are in slidable connection with the guide rails.

4. The roof system for a vehicle according to claim 3, wherein the locking mechanism comprises a locking lever and a locator, wherein the locator and locking lever comprise a pin slot and a locking pin slidably guided in the pin slot; and wherein the locator is fixedly attached to the guide rail; and wherein the pin slot has a first substantially longitudinal portion for guiding the locking pin and a second substantially perpendicular locking portion to lock the locking pin.

5. The roof system for a vehicle according to claim 1, wherein each of the guide rails comprises a front guide rail placed in front of a rear guide rail seen in the longitudinal direction and wherein the front and rear guide rails are separate parts and remote from each other and in line with each other and wherein the front guide rail is in slidable connection with the front mechanism and the tilting mechanism and the rear guide rail is in slidable connection with the locking mechanism.

6. The roof system for a vehicle according to claim 5, wherein the locking mechanism comprises a locking lever and a locator, wherein the locator and locking lever comprise a pin slot and a locking pin slidably guided in the pin slot; and wherein the locator is fixedly attached to the guide rail and wherein the pin slot has a first substantially longitudinal portion for guiding the locking pin and a second substantially perpendicular locking portion to lock the locking pin.

7. The roof system for a vehicle according to claim 2, wherein the front mechanism comprises a driving slide which is connected to first drive members for driving the driving slide and wherein a second drive member connects the driving slide to the locking mechanism for driving the locking mechanism at least during vertical movement of the rear edge of the first panel.

8. The roof system for a vehicle according to claim 7, wherein the tilting mechanism comprises a sliding guide slidably guided in the guide rail configured to move one end of an auxiliary lever in a substantially vertical direction and wherein said auxiliary lever is in slidable contact with the sliding guide and wherein the auxiliary lever at one end is pivotally connected to the slide claw, for moving the slide claw in a vertical direction and wherein said slide claw at opposite lateral sides is hingeably connected to a pair of lifting levers said lifting levers at an opposite end being pivotally connected to a housing, the housing being fixedly connected to the guide rail and wherein the sliding guide is provided with a first, second and third guide slots and wherein the auxiliary lever is provided with a first, second and third pin, each of which being slidably guided in the respective slots of the sliding guide and wherein the first guide slot of the sliding guide comprises a first substantially horizontal extending slot portion and a subsequently perpendicularly vertical locking slot portion and wherein the second guide slot comprises a substantially horizontal slot portion and wherein the third guide slot of the sliding guide comprises a first substantially horizontal portion and a subsequent upwardly curved portion.

9. The roof system for a vehicle according to claim 8, wherein the locking lever is pivotally connected to one lateral side of a hinge block and wherein a connecting rod is connected to the opposite lateral side of the hinge block, said connecting rod being connected to the tilting mechanism.

10. The roof system for a vehicle according to claim 9, wherein the second drive member being connected to the locking lever capable of driving the locking lever in a longitudinal direction and wherein the locking lever is hinge-ably connected to the hinge block, wherein said hinge block is connected to the connecting rod, which in turn is slidably connected to the sliding guide, wherein the interconnected aforementioned parts are capable of moving in longitudinal direction and therewith driving a part of the tilting mechanism in a vertical direction causing a vertical movement of a rear portion of the first panel.

11. The roof system for a vehicle according to claim 7, wherein the second drive member at a rear end and the locking lever at a front end are provided with a locking joint comprising a locking cam and a locking slot for engagement of the locking cam, wherein the locking slot is provided with a substantially longitudinal catching portion and a substantially perpendicular locking portion.

12. The roof system for a vehicle according to claim 3, wherein the locking mechanism is placed in the guide rails completely rear of a rear edge of the first panel seen in longitudinal direction of the vehicle.

13. The roof system for a vehicle according to claim 5, wherein the locking mechanism is placed in the guide rails completely rear of a rear edge of the first panel seen in longitudinal direction of the vehicle.

14. The roof system for a vehicle according to claim 3, wherein the roof system further comprises a second panel and wherein the locking mechanism is placed in the guide rail completely rear of a front edge of the second panel seen in the longitudinal direction of the vehicle.

15. The roof system for a vehicle according to claim 5, wherein the roof system further comprises a second panel and wherein the locking mechanism is placed in the guide rail completely rear of a front edge of the second panel seen in the longitudinal direction of the vehicle.

16. The roof system for a vehicle according to claim 3 further comprising a drain channel to drain water, the locking mechanism being placed in the guide rail at least partly underneath the drain channel seen in the vertical direction, and/or wherein the guide rail is provided with hole locally underneath the locking mechanism.

17. The roof system for a vehicle according to claim 5 further comprising a drain channel to drain water, the locking mechanism being placed in the guide rail at least partly underneath the drain channel seen in the vertical direction, and/or wherein the guide rail is provided with hole locally underneath the locking mechanism.

18. The roof system for a vehicle according to claim 10, wherein each of the guide rails comprises a front guide rail placed in front of a rear guide rail seen in the longitudinal direction and wherein the front and rear guide rails are separate parts and remote from each other and in line with each other and wherein the front guide rail is in slidable connection with the front mechanism and the tilting mechanism and the rear guide rail is in slidable connection with the locking mechanism, and wherein the front guide rail is placed in line with the rear guide rail such that second drive member and connecting rod, being slidably engaged in the front and rear guide rails, may extend between said front and rear guide rails and operationally drive respectively the locking mechanism in the rear guide rail and the tilting mechanism in the front guide rail.

19. The roof system for a vehicle according to claim 5, wherein the slidable connection between the front mechanism and the locking mechanism and the connection between the locking mechanism and the tilting mechanism is made by a pair of flexible cables guided in respective channels in the front and rear guide rails and wherein said cables, in between the front guide rail and the rear guide rail, are guided by cable tubes attached on opposite sides of the front and rear guide rails.

20. The roof system for a vehicle according to claim 15, wherein the rear guide rail is either of an aluminum or a plastic part and wherein said rear guide rail is mounted to either of the stationary part, an inner portion of the fixed roof or an inner surface of the second panel.

* * * * *